United States Patent
Yoneda et al.

(10) Patent No.: US 7,584,464 B2
(45) Date of Patent: Sep. 1, 2009

(54) SOFTWARE PROCESSING METHOD AND SOFTWARE PROCESSING SYSTEM

(75) Inventors: Kei Yoneda, Hyogo (JP); Isao Kawamoto, Hyogo (JP); Seiji Kita, Osaka (JP); Takaaki Matsubayashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1018 days.

(21) Appl. No.: 10/727,055

(22) Filed: Dec. 4, 2003

(65) Prior Publication Data

US 2004/0168154 A1 Aug. 26, 2004

(30) Foreign Application Priority Data

Dec. 6, 2002 (JP) .............................. P2002-355683

(51) Int. Cl.
*G06F 9/44* (2006.01)
*G06F 9/45* (2006.01)

(52) U.S. Cl. ....................... 717/158; 717/130
(58) Field of Classification Search ........................ None
See application file for complete search history.

(56) References Cited

U.S. PATENT DOCUMENTS

| 5,630,166 | A | | 5/1997 | Gamache et al. | |
| 5,913,043 | A | * | 6/1999 | Carter et al. | 710/100 |
| 6,058,412 | A | * | 5/2000 | Kojima et al. | 718/100 |
| 6,078,944 | A | | 6/2000 | Enko et al. | |
| 6,157,989 | A | | 12/2000 | Collins et al. | |
| 6,505,269 | B1 | * | 1/2003 | Potter | 711/202 |
| 7,155,722 | B1 | * | 12/2006 | Hilla et al. | 718/105 |
| 2003/0126260 | A1 | * | 7/2003 | Husain et al. | 709/225 |

FOREIGN PATENT DOCUMENTS

| JP | 06-243112 | 9/1994 |
| JP | 09-288648 | 11/1997 |
| WO | WO 93/16437 | 8/1993 |

* cited by examiner

*Primary Examiner*—Tuan Q Dam
*Assistant Examiner*—Hanh T Bui
(74) *Attorney, Agent, or Firm*—McDermott Will & Emery LLP

(57) ABSTRACT

In a multi-processor system constituted by a processor such as a CPU and a DSP, in which the processor and the DSP have an external memory and a bus as shared resources and the DSP carries out a process in response to a processing request from the processor, a monitoring step for status of use includes a step of monitoring the status of use of the DSP, and when contention information obtained in the monitoring step for the status of use indicates frequent uses, an altering step for software process appropriately alters a software processing method to be executed, and switches the corresponding process to an equivalent process so that it becomes possible to avoid bus contention, and consequently to prevent a reduction in the processing speed.

23 Claims, 33 Drawing Sheets

```
main()
{
    ..
    Func1()
    ..
    Func2()
    ..
    func3()
    ..
    ..
}
```

```
Func1()
{
    if(bus access is occurring)
        func1_non_bus_access();
    else
        func1();
}
Func2()
{
    if (bus access is occurring)
        func2_non_bus_access();
    else
        func2();
    ..
}
```

FIG. 11A

```
1: proc_task1() {
2:     mem_acs_many();
3: };
```

Prior to compiler execution

FIG. 11B

```
1: proc_task1() {
2:     if( task_time < DEFINED_TIME ) {
3:         start_time = timer_count;
4:         mem_acs_many();
5:         end_time  = timer_count;
6:         task_time = end_time - start_time;
7:     }
8:     else{
9:         mem_acs_few();
10:    };
11: };
```

After compiler execution

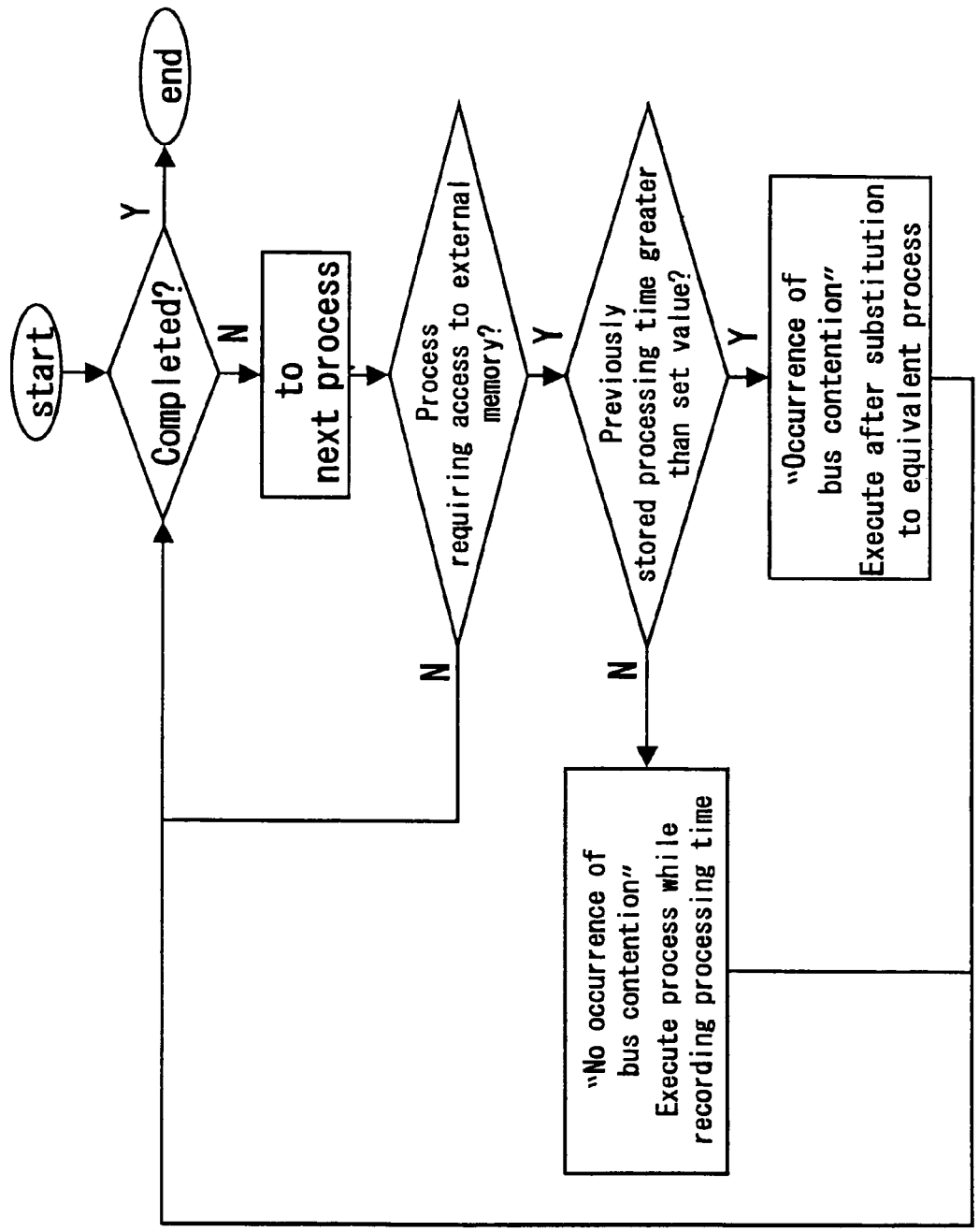
F I G. 12

F I G. 1 3

| Processing time Set value | Probability of substitution to equivalent process [%] | Probability of non-substitution to equivalent process [%] |
|---|---|---|
| -2.0 | 60 | 40 |
| 2.0 - 1.8 | 70 | 30 |
| 1.8 - 1.6 | 80 | 20 |
| 1.6 - 1.4 | 90 | 10 |
| 1.4 - 1.2 | 95 | 5 |
| 1.2 - 1.0 | 97 | 3 |
| less than 1 | 0 | 100 |

```
1: main()
2: {
3:    :
4:    func1()
5:    :
6:    func2()
7:    :
8:    func3()
9:    :
10: }
```

```
1: main()
2: {
3:    :
4:    func1()
5:    :
6:    func2()
7:    {
8:      if(DSP is in waiting state)
9:        func2_dsp();
10:     else
11:       func2_cpu();
12:    }
13:    :
14:    func3()
15:    :
16: }
```

F I G. 23
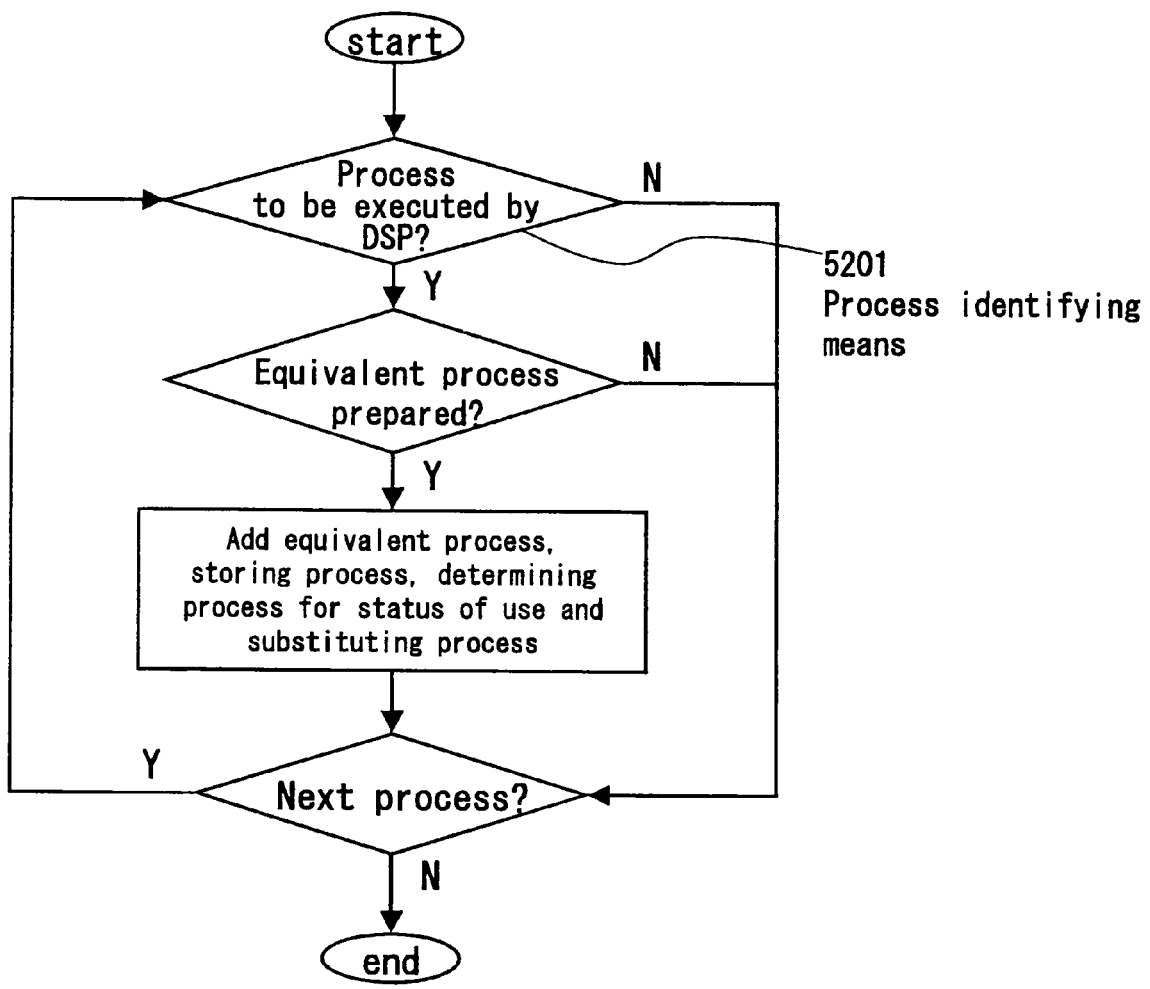

FIG. 24A

```
1: proc_task1() {
2:     dsp_task();
3: };
```

Prior to compiler execution

FIG. 24B

```
1: proc_task1() {
2:     if( wait_time < DEFINED_TIME ) {
3:         start_time = timer_count;
4:         Wait until DSP starts process
5:         end_time  = timer_count;
6:         wait_time = end_time - start_time;
7:         dsp_task();
8:     }
9:     else{
10:        proc_dsptask();
11:    };
12: };
```

After compiler execution

FIG. 26

| Processing time Set value | Probability of substitution to equivalent process [%] | Probability of non-substitution to equivalent process [%] |
|---|---|---|
| – 2.0 | 60 | 40 |
| 2.0 – 1.8 | 70 | 30 |
| 1.8 – 1.6 | 80 | 20 |
| 1.6 – 1.4 | 90 | 10 |
| 1.4 – 1.2 | 95 | 5 |
| 1.2 – 1.0 | 97 | 3 |
| less than 1 | 0 | 100 |

FIG. 30

```
1:   main()
2:   {
3:       :
4:       func1()
5:       func2()
6:       func3()
7:       func4()
8:       func5()
9:       func6()
10:      func7()
11:      func8()
12:      :
13:  }
```

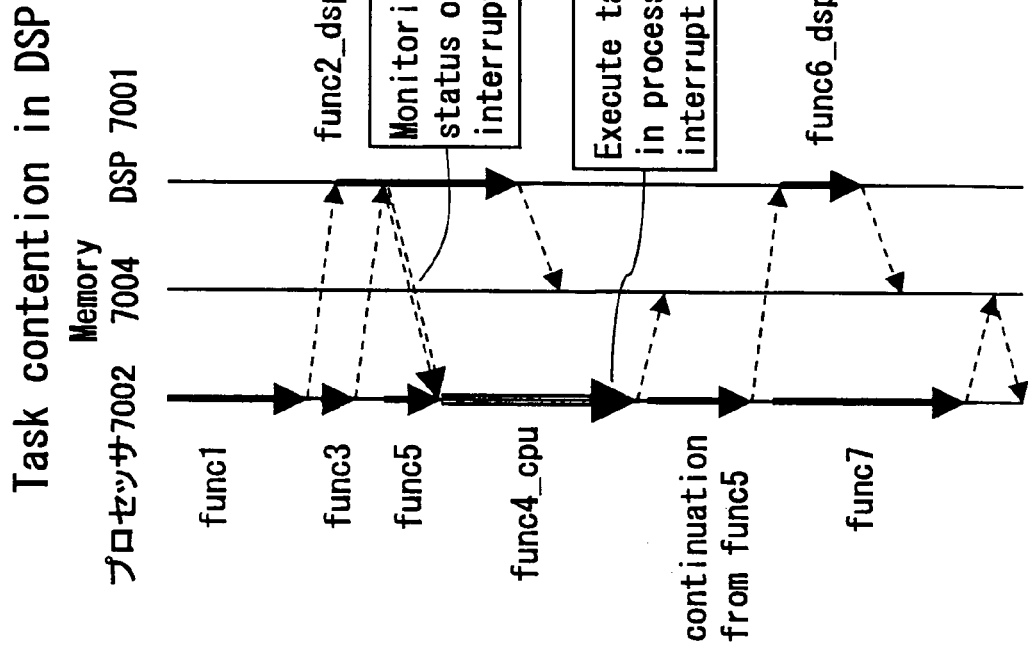
FIG. 32B Task contention in DSP
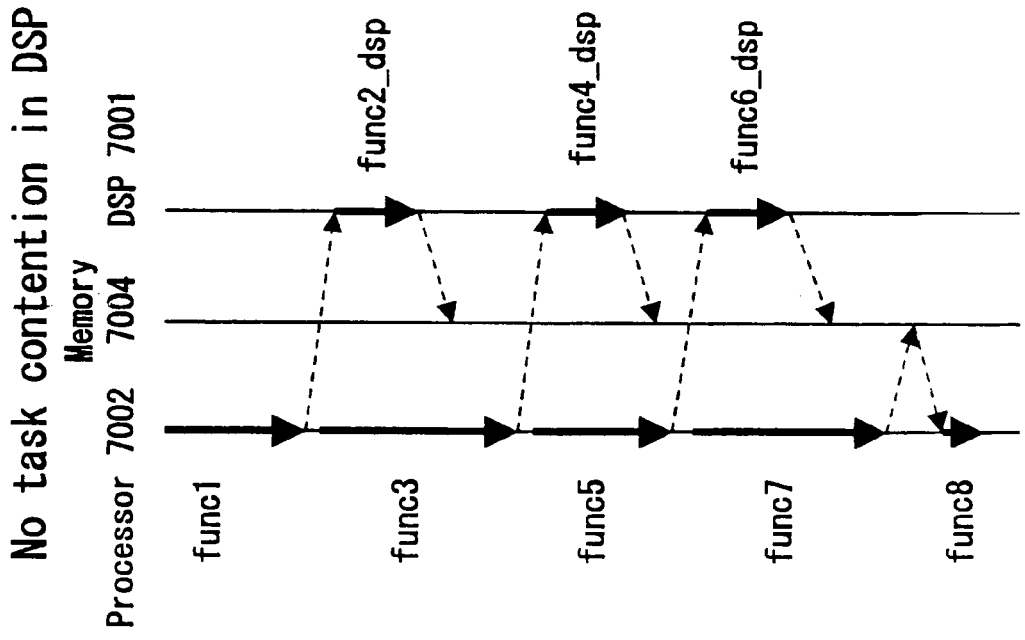
FIG. 32A No task contention in DSP

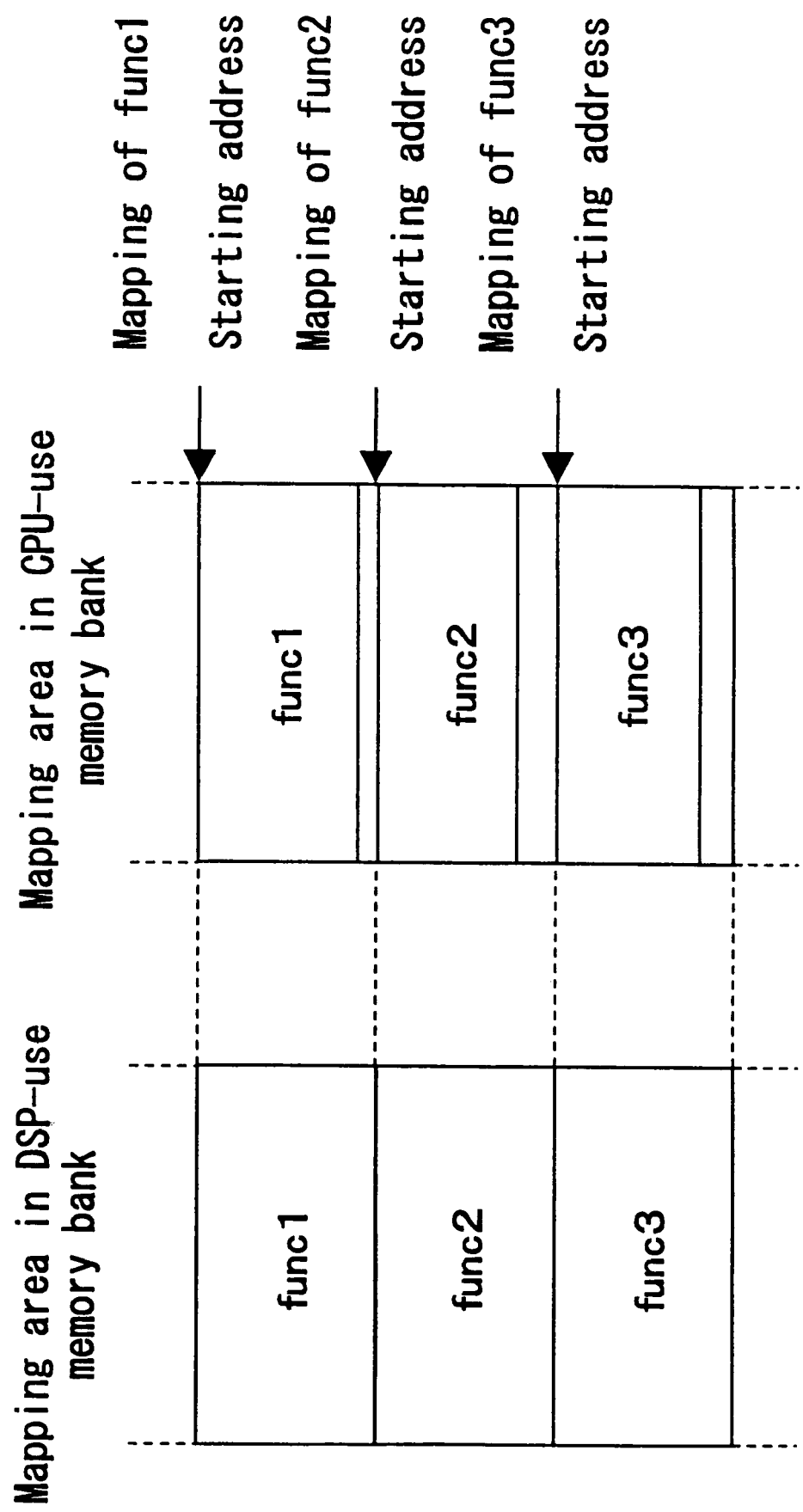
F I G. 36

SOFTWARE PROCESSING METHOD AND SOFTWARE PROCESSING SYSTEM

BACKGROUND OF THE INVENTION

This invention relates to a system having a processor and a shared resource, and more particularly concerns a technique for preventing a reduction in processing speed at the time of shared resource contention.

For example, in a multiprocessor system constituted by a processor such as a CPU and a DSP (digital signal processor), its processing performance is improved by executing processes in a shared manner between the processor and the DSP. Moreover, by using a memory, a bus, peripheral circuits and the like as shared resources, the chip area can be reduced to achieve low costs.

When, during a data-reading process of the processor toward an external memory, the DSP also issues a data reading process to the same memory to cause an access contention, a bus arbitration circuit controls processes causing the access contention. With respect to the controlling method of the bus arbitration circuit, although a data-reading process from the DSP is accepted, a data-reading process from the DSP is queued until the data reading process from the processor has been completed.

Moreover, in a multiprocessor system that is constituted by a processor and a DSP with the processor conducting a rejecting control process on the DSP, the DSP accepts a processing request from the processor regardless of the state of the DSP; however, when the DSP is executing another process, the DSP does not start the corresponding process immediately, and waits for a while, and upon returning to an executable state, it executes the process in an autonomous manner, and returns the results of the process to the processor side.

However, in the conventional system having a shared resource, in the case when access contention to the shared resource occurs frequently, the number of waiting states until the completion of the preceding process increases, resulting in a reduction in the processing speed in the entire system.

Moreover, the arbitration circuit is only allowed to confirm the state of the shared resource, and is not allowed to confirm the state of the entire system. For example, upon issuance of a processing request from the processor to the DSP while the DSP is executing another process, the conventional arbitration circuit makes the process queued until the preceding process has been completed. Here, since the processor executes the next process in response to the results of the process that has been issued to the DSP, the processor is sometimes set to a waiting state. In such a state, the process that has been issued to the DSP and the processor that is the source of the issuance thereof are maintained in a waiting state until the preceding process has been completed, with the result that the processor and the DSP cannot be used efficiently.

Moreover, in the above-mentioned conventional system having a shared resource, in order to avoid DSP contention in which processing requests to the DSP take place in an overlapped manner, it is necessary to appropriately assign pieces of software to the CPU and the DSP. These assigning processes are carried out manually, resulting in problems in that a great amount of time is required every time a revision in software occurs to cause the subsequent increase in the number of processes.

SUMMARY OF THE INVENTION

Therefore, a main objective of the present invention is to provide a software processing method and a system for use in such a method, which, upon occurrence of a resource contention, make it possible to avoid stoppage of processes at the time of the resource contention, and consequently to suppress a reduction in the system processing speed.

These and other objectives, features and advantages of the invention will be made clearer by a description thereof given below.

The following description will discuss a plurality of kinds of constituent element means, and these means may be constituted by software or hardware, or may be formed by a combination of hardware and software.

In order to achieve the above-mentioned objective, the present invention is provided with the following means.

A software processing method in accordance with the present invention, which is applied to a system constituted by a processor and a resource used by the processor, is provided with a monitoring process for status of use, which monitors the status of use of a resource to be used by the processor and an altering process for software processes, which appropriately changes a software processing method to be executed in accordance with contention information obtained by the above-mentioned monitoring process for the status of use.

A software processing system of the present invention, which corresponds to the above-mentioned software processing method, is provided with a processor, a resource which the processor uses, a monitoring device for the status of use, which monitors the status of use of the resource, and an alternating device which appropriately changes a software processing method to be executed in accordance with contention information obtained by the above-mentioned monitoring device for the status of use.

In accordance with the above-mentioned arrangement, the contention of the resource is dynamically determined, and in the case when the number of contentions is higher than a certain level, the processor makes it possible to avoid stoppage of processes at the time of resource contention by appropriately altering the software processing method that uses the resource, and consequently to suppress a reduction in the system processing speed.

In the above-mentioned arrangement, in one aspect of the altering process for software processes or the altering device for software processes, a plurality of executing methods that allow software to execute a process are prepared, and while the software is executing the process, one of the executing methods is selected in response to contention information obtained by the monitoring process for the status of use. This selection is made from the executing methods, and provides the simplest system.

In the above-mentioned arrangement, when the resource is a storing device for a process, the monitoring process for the status of use monitors the status of use of the storing device. With this arrangement, the occurrence of access contention to the storing device is reduced so that the storing device can be used with high efficiency. Therefore, it becomes possible to alleviate influences from a reduction in the system processing speed due to the occurrence of contention for the storing device.

In the above-mentioned arrangement, in one aspect of the monitoring process for status of use, the process is allowed to store the preceding statuses of use of the storing device corresponding to a plurality of previous clocks so that the contention information is generated based upon the previous and current status of use. Moreover, in the above-mentioned arrangement, in another aspect of the monitoring process for status of use, the process is allowed to store the time of use of the storing device when it is in use, and based upon whether or not the time of use is not less than a predetermined value, the contention information is generated. It becomes possible to easily determine the status for use of the storing device by using the number of clocks or time as index.

In the above-mentioned arrangement, in the case when the resource is provided with a storing device for a process and a bus that connects the processor to the storing device, in one aspect of the monitoring process for status of use, the process is allowed to monitor the status of use of the bus. In this case, the determination of contention for the resource is executed based upon the determination of contention for the bus access. With this arrangement, the occurrence of access contention to the bus is reduced so that the bus can be used with high efficiency. Therefore, it becomes possible to alleviate influences from a reduction in the system processing speed due to the occurrence of access contention to the bus.

In the above-mentioned arrangement, in one aspect of the monitoring process for status of use, the process is allowed to store the preceding statuses of use of the bus corresponding to a plurality of previous clocks so that the contention information is generated based upon the previous and current statuses of use. Moreover, in this case, in another aspect of the monitoring process for status of use, the process is allowed to store the time of use of the bus when it is in use, and based upon whether or not the time of use is not less than a predetermined value, the contention information is generated. It becomes possible to easily determine the status for use of the bus by using the number of clocks or time as index.

In the above-mentioned arrangement, in the case when the resource is a second processor that executes a process in response to a processing request from the processor (referred to as a first processor), in one aspect of the monitoring process for status of use or the monitoring device for status of use, the process is allowed to monitor the status of use of the second processor.

This arrangement is preferably used, when the first processor controls the second processor based upon the rejecting control system. In the rejecting control system, the first processor gives a processing request to the second processor, and the second processor accepts the processing request regardless of the status of its own, and the first processor is shifted so as to execute another process. The second processor, which has accepted the processing request, determines the status of its own, and when it is executing another process, it enters a waiting state, and after completion of said another process, starts to execute the corresponding process, and returns the results of the process to the first processor. In this controlling system, since a plurality of processes are in contention for the second processor, the second processor forms a shared resource.

In this arrangement, upon occurrence of another process when the second processor is in use, an interrupting function, which generates an interrupting operation by using an interrupt signal that is directed to the first processor as the contention information, may be prepared. Except for the preparation of an interrupting routine, the software, as it is, can be applied without the necessity of any revision and addition to the original software, and this arrangement is less susceptible to overhead operation of software, since no contention-resolving process by the use of software is required.

In the case when the above-mentioned software processing method is provided with a plurality of memory banks that are accessed by using the same address, in one aspect of the contention information obtained in the monitoring process for status of use, contention information is given as a signal that indicates selection of one of the memory banks. In this case, a function for switching the selection signals used for selecting one of the memory banks, each time a process is executed in the second processor, or each time a process executed by the second processor has been finished, is preferably prepared.

By selecting the memory banks, it becomes possible to prevent stoppage of the processes upon occurrence of a processor contention, and consequently to suppress a reduction in the processing speed of the system. Since the contention-resolving process is achieved by using only the memory-bank switching circuit, it is possible to provide faster operations in comparison with other methods.

In the case when the above-mentioned software processing method is further provided with a software compiler, in one aspect of the compiler, the compiler further adds to software the following means and processes: a process identifying means which identifies whether or not a process uses the resource from software; an equivalent process that is equivalent to the process identified by the process identifying means, and does not use the resource; a determining process for the status of use, which determines the status of use based upon contention information obtained in the process of monitoring the status of use; and a substituting process which substitutes the equivalent process appropriately for the process identified by the process-identifying means based upon the results of the determining process for the status of use.

Moreover, in the case when the above-mentioned software processing method is further provided with a software compiler, in another aspect of the compiler, the compiler further adds to software the following means and processes: a process identifying means which identifies whether or not a process uses the resource from the software; an equivalent process that is equivalent to the process identified by the process identifying means, and does not use the resource; a storing process for storing contention information obtained in the process of the monitoring process for status of use at the current time; a determining process for determining the status of use based upon the contention information at the past time; and a substituting process which substitutes the equivalent process appropriately for the process identified by the process-identifying means based upon the results of the determining process for the status of use. With this arrangement, the past history of contentions is incorporated into the process so that it becomes possible to carry out the determination on resource contention with high precision.

In the above-mentioned arrangement, in one aspect of the contention information, the contention information is prepared as "processing time" from the issuance of the processing request for the resource until the completion of the process. In this case, the determining process for the status of use is a process which compares the processing time to a preset value.

In the above-mentioned arrangement, in another aspect of the contention information, the contention information is prepared as "waiting time" from the issuance of the processing request for the resource until the start of the process. In this case, the determining process for the status of use is a process which compares the waiting time to a preset value.

In accordance with this arrangement, it is determined whether or not any resource contention is occurring by measuring the waiting time for the process and the processing time, and when any resource contention is occurring, a process which would newly cause a resource contention is no longer issued. Thus, it becomes possible to prevent a reduction in the processing speed of the system due to contention.

In the above-mentioned arrangement, in one aspect of the determining process for status of use, the process is allowed to reexamine the determination for the status of use of the resource regularly or irregularly. In this case, the determination for the status of use of the resource is preferably reexamined by using random numbers. With this arrangement, since the contention determination is corrected regularly or irregularly, it becomes possible to carry out the contention determination with higher precision.

In the above-mentioned software processing method, in the case when processes to be extracted by the process-identifying means in the compiler are extracted from a plurality of portions of the software, in one aspect of the compiler, the compiler further adds to the software an identifying process for identifying the portions of appearance of the processes identified by the process-identifying means, and the storing process stores the contention information for each of the portions of appearance so that the determining process for status of use carries out the determination by using the contention information stored for each of the portions of appearance. With this arrangement, since the contention information is stored together with the portion of appearance of the process that causes the contention; therefore, it becomes possible to carry out the contention determination in a loop process with higher precision.

As described above, in accordance with the present invention, by taking a resource contention and a contention of processes to be executed on a processor into consideration, it becomes possible to avoid the stoppage of a process to a minimum even upon occurrence of any contention, and also to suppress a reduction in the processing speed of the system. Moreover, it becomes possible to eliminate the necessity of manually assigning the processes, and consequently to reduce the number of processes.

The foregoing and other aspects will become apparent from the following description of the invention when considered in conjunction with the accompanying drawing figures.

BRIEF DESCRIPTION OF THE DRAWING FIGURES

FIG. 11A and FIG. 11B show altering processes with respect to frequently accessing processes to an external memory in the software processing system in accordance with the second embodiment of the present invention.

FIG. 12 shows a flow chart that represents a determining flow of bus contention in the software processing system in accordance with the second embodiment of the present invention.

FIG. 13 shows the probability of substitution to the equivalent process in the software processing system in accordance with the second embodiment of the present invention.

FIG. 23 shows a flow chart that represents a processing flow of a compiler in the software processing system in accordance with the fourth embodiment of the present invention.

FIG. 24A and FIG. 24B show an alteration to processes that are carried out by DSP in the software processing system in accordance with the fourth embodiment of the present invention.

FIG. 26 shows the probability of substitution to the equivalent process in the software processing system in accordance with the fourth embodiment of the present invention.

FIG. 30 shows a software structure of a software processing system in accordance with the fifth embodiment of the present invention.

FIG. 32A and FIG. 32B are sequential diagrams that show a flow of processes in the software processing system in accordance with the fifth embodiment of the present invention.

FIG. 36 shows a memory bank mapping in accordance with the sixth embodiment of the present invention.

In all these figures, like components are indicated by the same numerals.

DETAILED DESCRIPTION (Basic structure)

Figure 1:
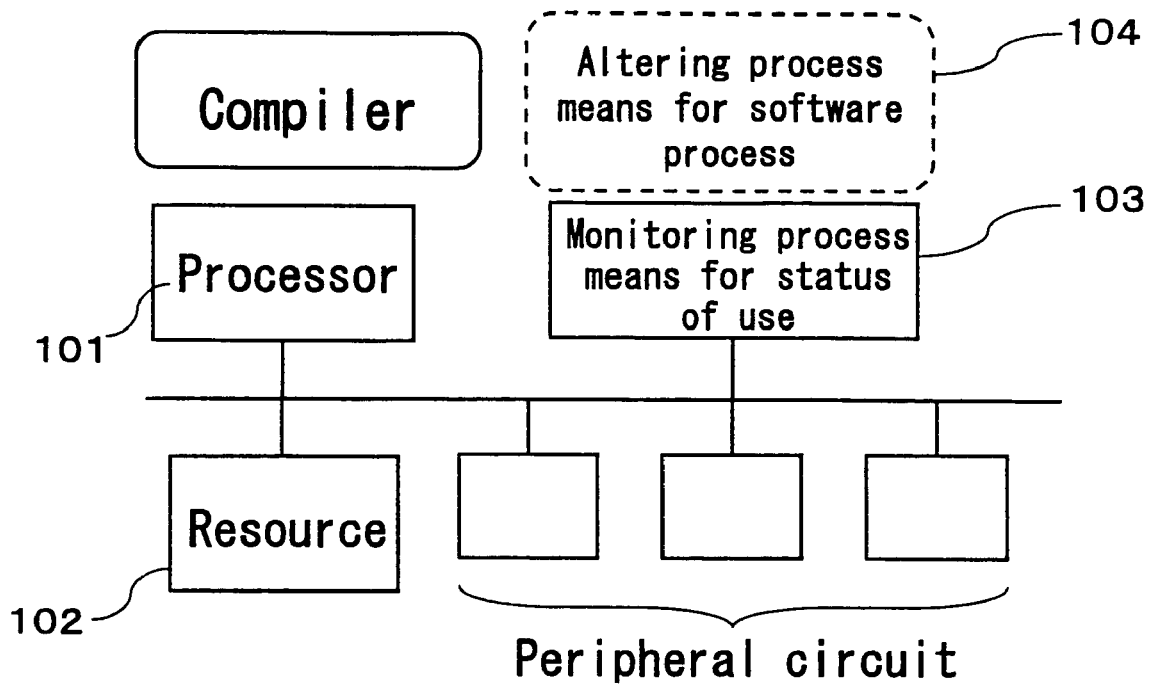
FIG. 1 is a block diagram that shows a basic structure of a software processing system in accordance with embodiments of the present invention.

FIG. 1 shows a basic structure of a software processing system in accordance with embodiments of the present invention.

When a processor 101 starts to execute a software processing, a monitoring process means 103 for status of use monitors the status of use of a resource 102 to be used by the processor 101, and receives the output thereof to obtain information concerning the status of use of the resource 102. In accordance with the result of the information concerning the status of use of the resource 102, an altering process means 104 for the software processing appropriately alters the processing method for the software to be executed.

Here, with respect to the monitoring process means 103 for the status of use and the altering process means 104 for the software processing, it is assumed that these means are respectively achieved by using software; however, the present invention is not limited to this arrangement, and these means may be achieved by hardware. Any means may be used as long as the means have at least functions for monitoring the status of use of the resource 102 and for obtaining information concerning the status of use, as well as functions for receiving the output of the information concerning the status of use and for appropriately altering the processing method for the software.

Referring to Figures, the following description discusses first to sixth embodiments.

First Embodiment

Referring to Figures, the following description discusses the first embodiment.

Figure 2:
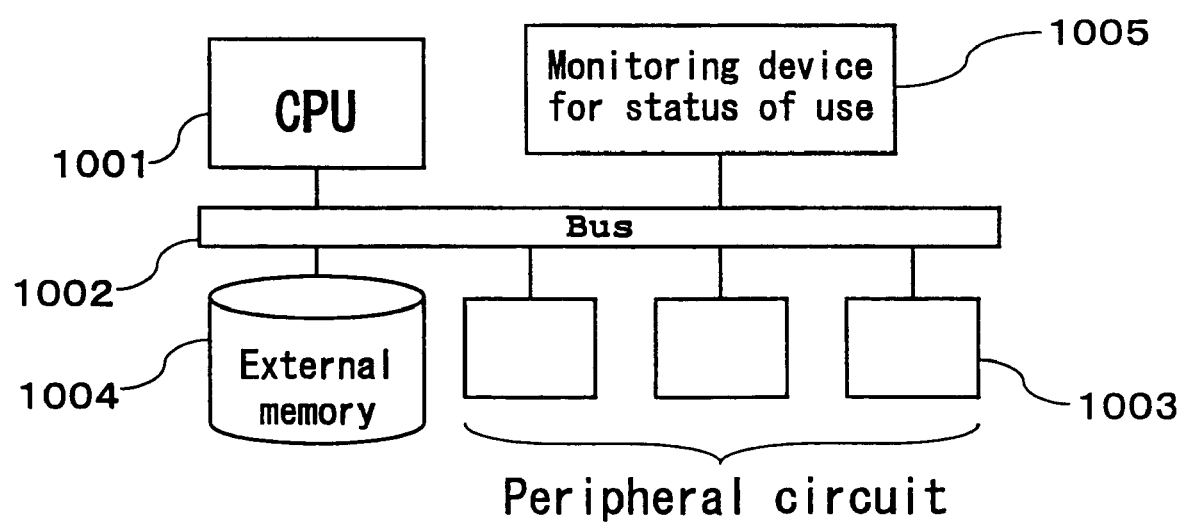
FIG. 2 is a block diagram that shows a hardware structure of a software processing system in accordance with a first embodiment of the present invention.

FIG. 2 is a block diagram the shows a hardware structure of a software processing system in accordance with the first embodiment. Reference numeral 1001 represents a CPU, 1002 represents a bus that the CPU 1001 uses, 1003 represents a peripheral circuit of the CPU 1001, 1004 represents an external memory, and 1005 represents a monitoring device for the status of use, which stores the state of a bus access on the bus 1002.

Figure 3:
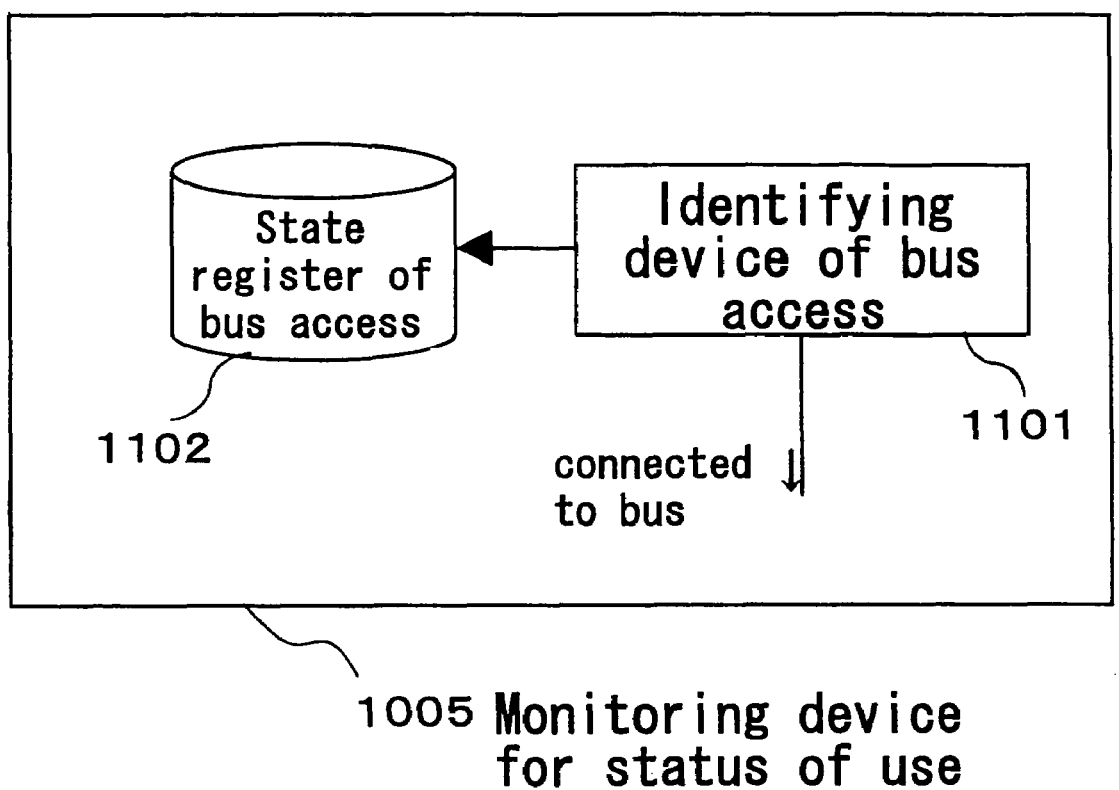
FIG. 3 shows a structure of a monitoring device for status of use of a bus in the software processing system in accordance with the first embodiment of the present invention.

FIG. 3 shows a structure of the monitoring device 1005 for the status of use. Reference numeral 1101 represents a bus-access identifying device that identifies whether or not any bus access is occurring on the bus 1002 for only a specific period of time, and 1102 represents a status register for bus access, which receives the output of the buss-access identifying device and records the status of the bus access.

Figure 4:
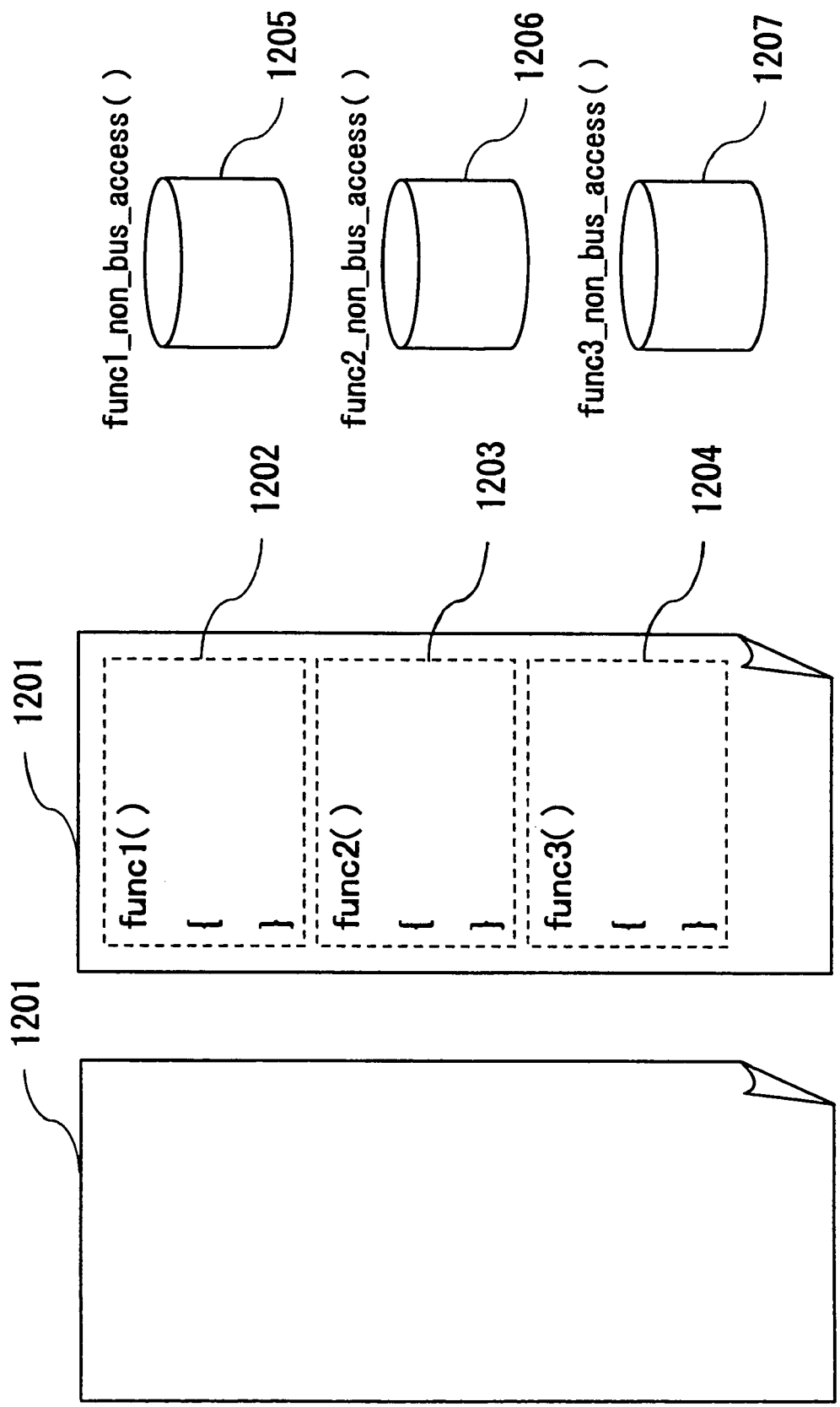
FIG. 4A shows a structure of software in the software processing system in accordance with the first embodiment of the present invention.
FIG. 4B shows a process described in a program.
FIG. 4C shows an equivalent process in which no bus is used.

FIG. 4 shows a software structure of the above-mentioned software processing system. Reference numeral 1201 represents a program that is operated on the CPU 1001, 1202, 1203 and 1204 are processes written in the program 1201, and 1205, 1206 and 1207 represent processes that have the same functions as the processes of 1202, 1203 and 1204, and serve as processes for use in the CPU 1001 in which the bus 1002 is not used.

Figure 5:
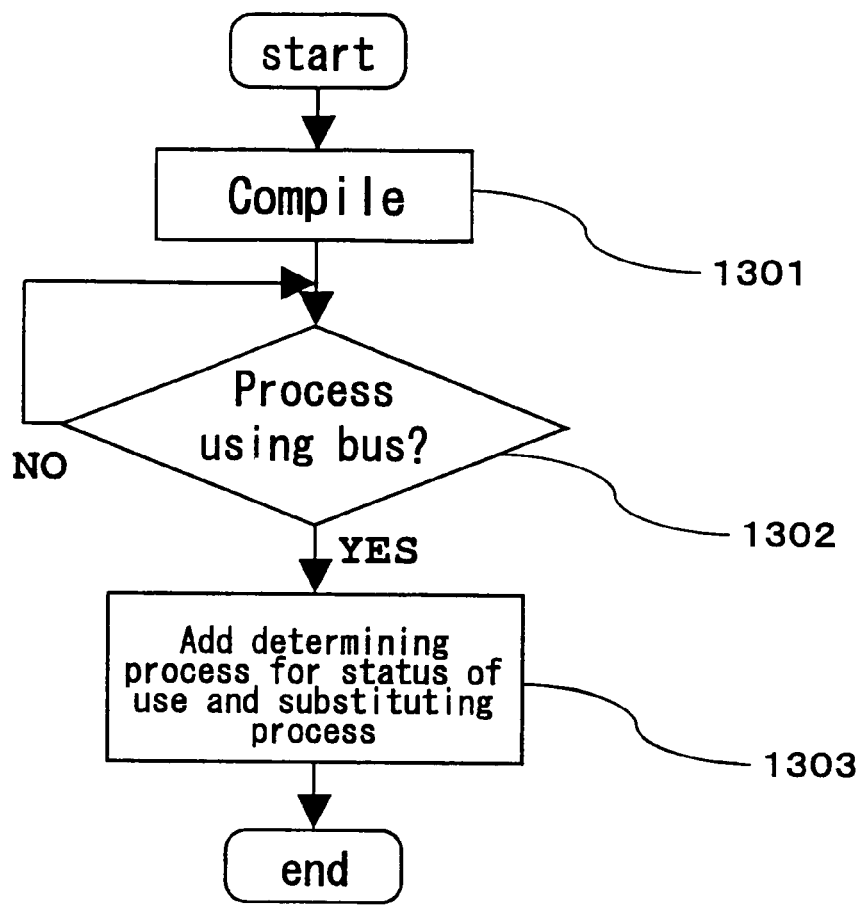
FIG. 5 shows a flow chart that represents a compile flow in the software processing system in accordance with the first embodiment of the present invention.

FIG. 5 shows a flow chart indicating a compile flow in the above-mentioned software processing system. Reference numeral 1301 represents a compile means in which a compiler compiles the program 1201. Reference numeral 1302 represents a process-identifying means which identifies whether or not a process in question uses the bus 1002 in the process written in the program 1201. Reference numeral 1303 represents a process addition means which adds a determining process for the status of use and a substituting process. Here, the determining process for the status of use corresponds to a program which, upon receipt of the output of the process-identifying means 1302, reads the value of the status register 1102 for bus access in the monitoring device 1005 for the status of use, and dynamically determines the bus-access information. Moreover, the substituting process refers to a process in which the process that has been identified as a process that uses the bus 1002 by the process identifying means 1302 is substituted with an equivalent process that is equivalent to the above-mentioned process, and does not use the resource, by the process identifying means 1302.

Figure 6:
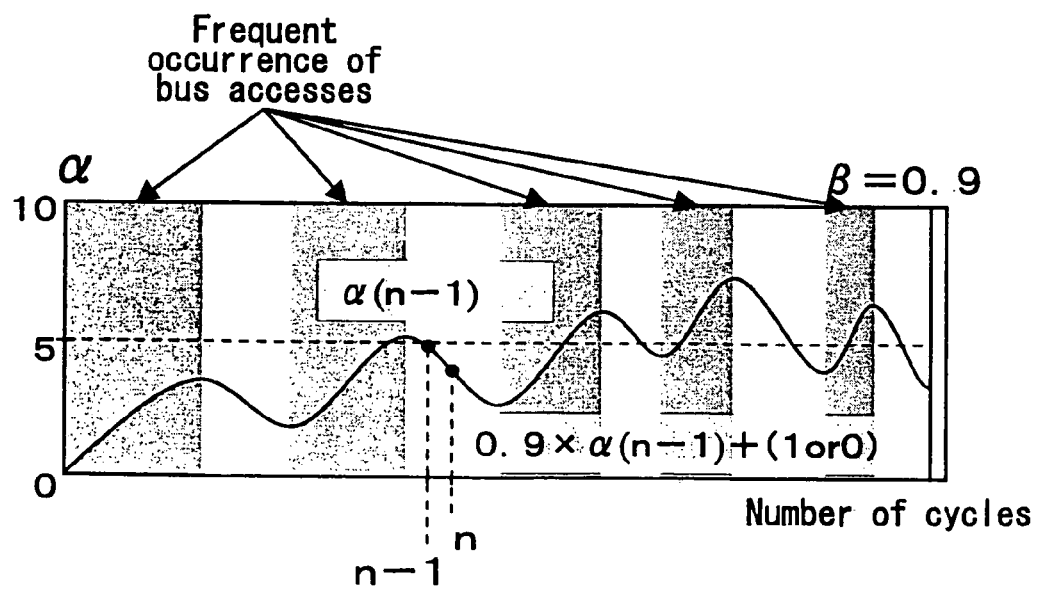
FIG. 6 shows a state of a bus access that is identified by a bus-access identifying device in the software processing system in accordance with the first embodiment of the present invention.
Figures 7A, 7B:
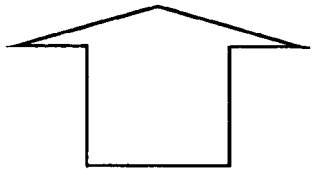
FIG. 7A and FIG. 7B show software altering processes that are conducted by a process addition means in the software processing system in accordance with the first embodiment of the present invention.

FIG. 6 shows a state of bus access that is identified by the bus-access identifying device 1101. FIG. 7 shows an alteration of software that is carried out by the above-mentioned process addition means 1303.

The following description discusses operations of the software processing system in accordance with the present embodiment.

Processes 1202, 1203 and 1204, written in the program 1201, are operated by the CPU 1001 in succession in the written order. In this case, it is assumed that the processes 1202 and 1203 use the bus 1002.

As shown in FIG. 4 and FIG. 5, upon compiling the program 1201, the compile means 1301 first compiles the processes 1202, 1203 and 1204. Simultaneously, the process identifying means 1302 identifies the processes 1202 and 1203 as processes that use the bus 1002.

Next, the process addition means 1303 adds the determining process for the status of use and the substituting process immediately before the executions of the process 1202 and the process 1203. With these addition processes, the process of the program 1201 is allowed to carry out a determining process for the status of use and also to execute a substituting process, if necessary, immediately before the execution of the process 1202.

The bus access identifying device 1101 calculates the frequency of bus accesses $\alpha$, and records the results in the status register 1102 for bus access. As shown in FIG. 6, the bus access frequency $\alpha$ increases as the bus access occurs, and decreases when no bus access occurs. The degree of the size of the frequency of bus accesses $\alpha$ can be desirably set.

Here, supposing that the degree of the frequency of bus accesses $\alpha$ is represented by $\beta$, the frequency of bus accesses $\alpha$ is calculated as follows: First, $\alpha$ is multiplied by $\beta$ for each cycle, and 1 is added to the value ($\alpha \times \beta$) when a bus access is occurring, while 0 is added thereto when no buss access is occurring. In other words, supposing that the value of $\alpha$ corresponding to n-numbered cycle is $\alpha(n)$, the following equation holds:

$$\alpha(n) = \beta \times \alpha(n-1) + (1 \text{ or } 0)$$

Here, for example, supposing that $\beta=0.9$, the value of $\alpha$ is set to a value between 0 to 10.

$$\alpha(1) = 1$$

$$\alpha(2) = 0.9 + 1$$

$$\alpha(3) = 0.9^2 + 0.9 + 1$$

$$\alpha(4) = 0.9^3 + 0.9^2 + 0.9 + 1$$

$$\ldots$$

$$\alpha(n) = 0.9^{n-1} + 0.9^{n-2} + \ldots 0.9^2 + 0.9 + 1 \quad [1]$$

$$0.9 \cdot \alpha(n) = 0.9^n + 0.9^{n-1} + \ldots 0.9^2 + 0.9 \quad [2]$$

Supposing that n is sufficiently great, the following equation is obtained by subtracting equation [2] from equation [1]:

$$(1 - 0.9) \cdot \alpha(n) = 1$$

$$\therefore \alpha(n) = 10$$

It is understood that the bus-access frequency $\alpha$, which serves as an index showing whether or not bus accesses occur frequently, is converged to the limiting value 10.

When $\beta$ is set to 0.9, the relationship between the bus-access frequency $\alpha$ and the number of cycles is shown by FIG. 6. In an area in which the bus-access frequency $\alpha$ increases, bus cycles occur frequently, while in an area in which the bus-access frequency $\alpha$ decreases, no bus access occurs.

As described above, the bus-access identifying device 1101 calculates the value of bus-access frequency $\alpha$, and records the resulting value in the status register 1102 for bus access.

The determining process for the status of use in the process addition means 1303 is carried out as follows: first, the bus-access frequency $\alpha$ stored in the status register 1102 for bus access is read, and compared to a specific threshold value used for determining whether or not bus accesses occur frequently so that the state of bus access is determined. This threshold value can be desirably determined. In the above-mentioned case of $\beta=0.9$, $\alpha$ is allowed to have a value between 0 to 10. In the case when the threshold value is set to 5, if the bus access frequency $\alpha$ is greater than 5, it is determined that bus accesses frequently occur at this time. In contrast, if the bus access frequency $\alpha$ is not more than 5, it is determined that bus accesses do not occur so frequently.

As the result of this determination, when the bus 1002 is used frequently, instead of the process 1202, a process 1205 is executed in accordance with the substituting process. In contrast, as the result of the determination, when the bus 1002 is not used so frequently, the process 1202 is executed.

In the same manner, with respect to the process 1203 also, the determining process for the status of use and the substituting process are carried out; thus, when the bus 1002 is used frequently, the process 1206 is executed in place of the process 1203, and when the bus 1002 is not used so frequently, the process 1203 is executed.

In accordance with the present embodiment, the bus access contention is dynamically determined by the determining process for the status of use and the substituting process, and when the bus-access frequency is higher than a predetermined level, the corresponding process is appropriately altered to an equivalent process in which no bus is used. With this arrangement, it is possible to reduce the occurrence of bus access contention, and consequently to effectively use the bus while avoiding stoppage of the process; thus, it becomes possible to reduce influences due to a reduction in the system processing speed.

Here, in the present embodiment, a single CPU is used as the processor and a single bus is used as the resource; however, a plurality of CPUs and a plurality of buses may be used. In short, at least one resource and at least one processor that uses the resource are required. For example, with respect to memory contention in the case when the CPU uses a shared memory, the present embodiment makes it possible to reduce the occurrence of the memory contention, and consequently to effectively use the memory; thus, it becomes possible to reduce influences due to a reduction in the system processing speed caused by the occurrence of the memory contention.

Additionally, in the present embodiment, the value of bus-access frequency $\alpha$ is found by the status register for bus access; however, the system for finding the bus-access frequency and the method for finding the bus-access frequency are not necessarily limited to those of the present invention, and any system and any method may be used with the same effects, as long as those values are found as indexes.

Second Embodiment

Next, referring to FIGS. 8 to 15, the following description discusses a software processing system in accordance with a second embodiment, which relates to a case in which the processor controls the DSP by using a rejecting control system, in detail. In the rejecting control system, the processor gives a processing request to the DSP, and the DSP accepts the processing request regardless of its own status, and the processor is shifted to execute another process. Upon receipt of the processing request, the DSP determines its own status, and in the case when it is executing another process, the DSP enters a waiting state, and after having completed said another process, it starts to execute the corresponding process, and returns the results of the process to the processor. In this controlling system, since a plurality of processes are in contention for the DSP, the DSP forms a shared resource.

Figure 8:
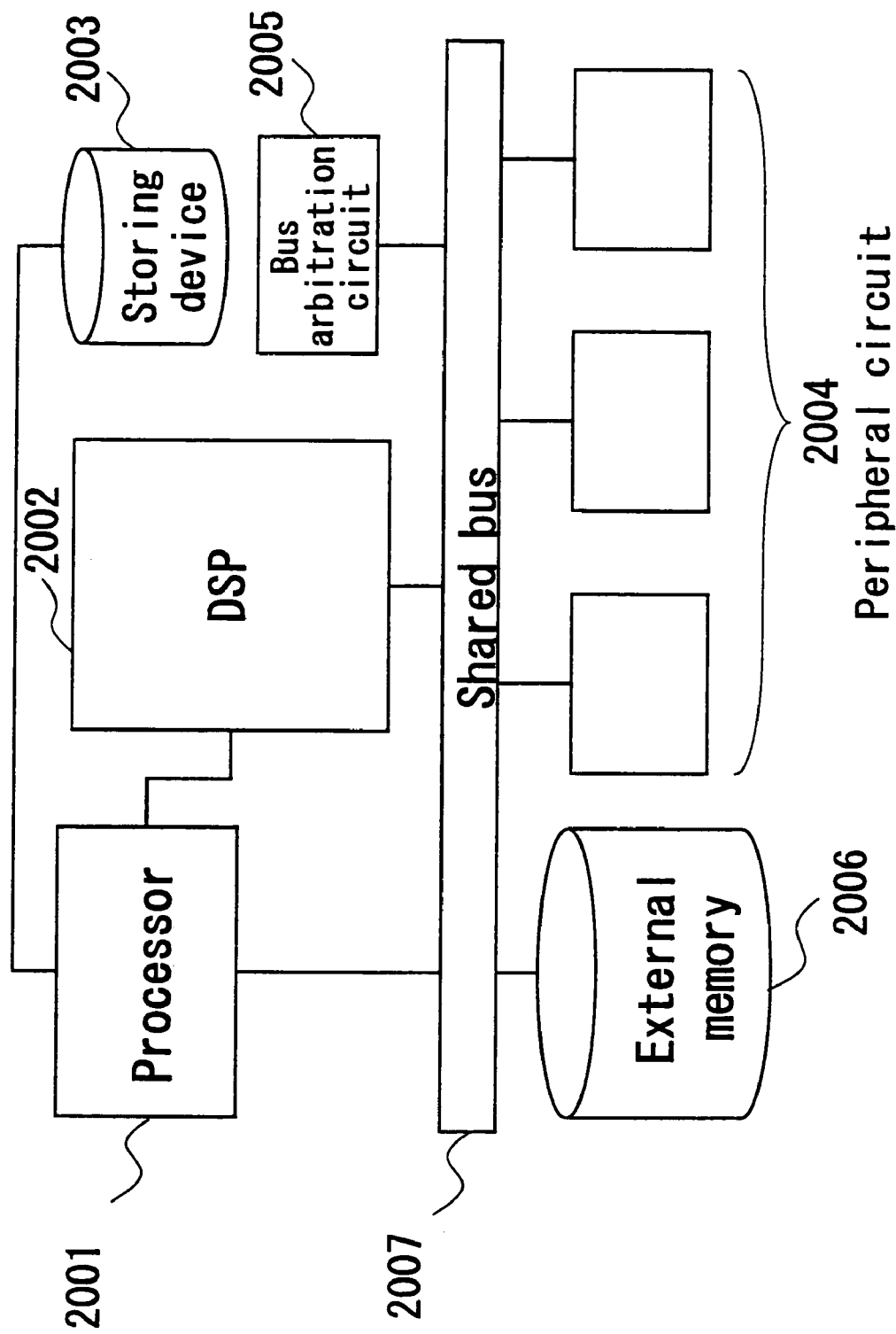
FIG. 8 is a block diagram that shows a hardware structure of a software processing system in accordance with a second embodiment of the present invention.

FIG. 8 is a block diagram that shows a hardware structure of a software processing system in accordance with the second embodiment. The software processing system is constituted by a processor 2001, a DSP 2002, a storing device 2003 that stores software to be executed by the processor 2001 and the DSP 2002, a peripheral circuit 2004, a bus arbitration circuit 2005, an external memory 2006 and a shared bus 2007.

The processor 2001 controls the DSP 2002 through the rejecting control system. In the case when software read by the processor 2001 from the storing device 2003 corresponds to a process to be executed by the DSP 2002, the processor 2001 issues a processing request to the DSP 2002, and upon receipt of the processing request, the DSP 2002 executes the corresponding process. The external memory 2006 is a shared memory that is used when the processor 2001 and DSP 2002 execute the process. The bus arbitration circuit 2005 controls bus accesses, and when an access contention to the shared memory, that is, a bus contention for the shared bus 2007, occurs, determines whether or not a process for accessing the external memory 2006 needs to be executed.

Figure 9:
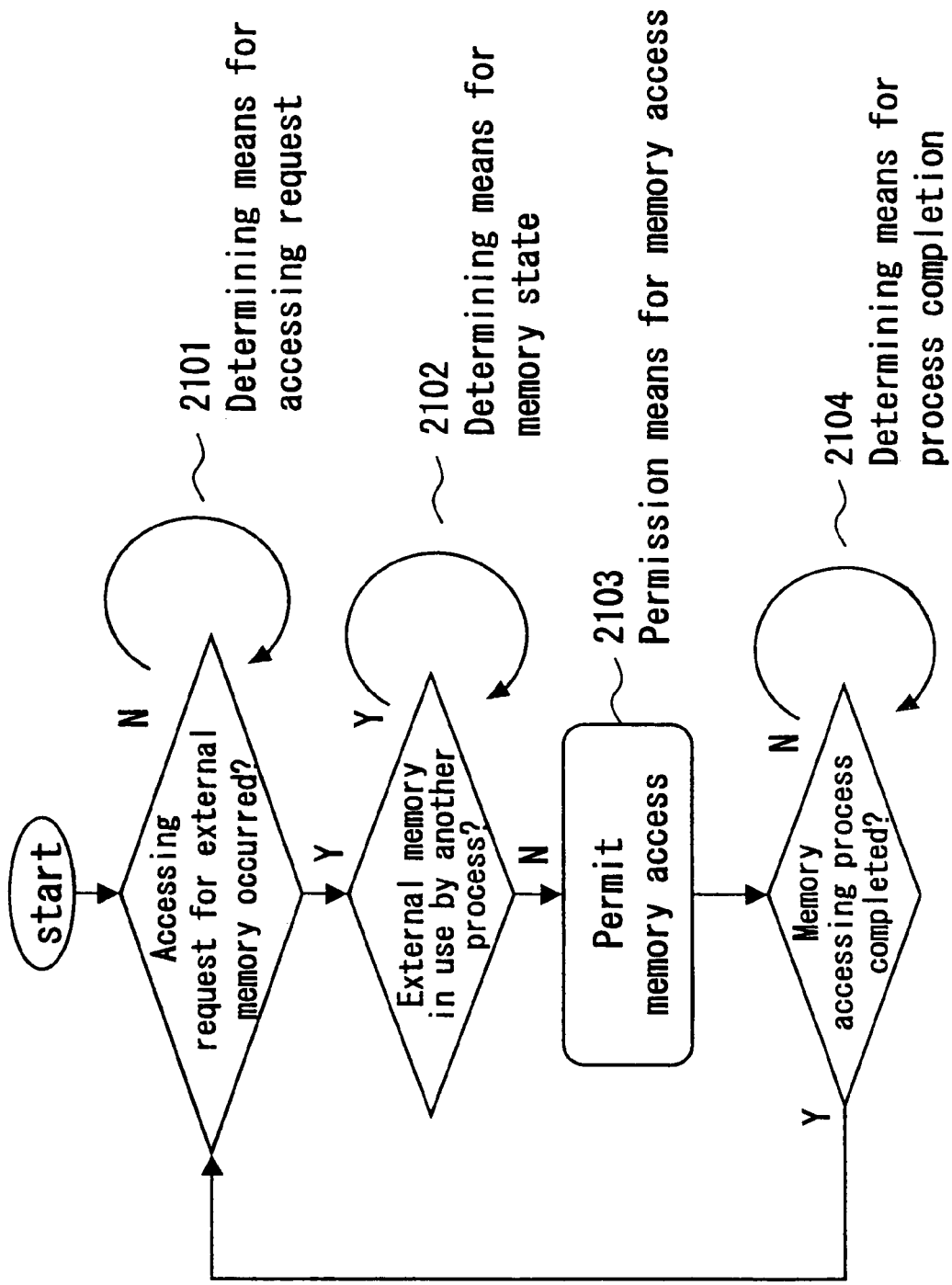
FIG. 9 shows a flow chart that represents a control flow of a bus arbitration circuit in the software processing system in accordance with the second embodiment of the present invention.

FIG. 9 shows a controlling flow of the bus arbitration circuit 2005. Reference numeral 2101 represents a determining means for an accessing request, which determines whether or not an accessing request (request for reading or writing) to the external memory 2006 serving as a shared memory is given. Reference numeral 2102 represents a determining means for a memory status, which determines whether or not the external memory 2006 is being currently accessed. Reference numeral 2103 represents a permission means which releases the bus in response to the accessing request, and allows an access to the memory. Reference numeral 2104 represents a determining means for process completion which determines whether or not the process has been completed.

When, upon accessing the external memory 2006, another accessing request to the external memory 2006, that is, a bus contention, occurs, the bus arbitration circuit 2005 once accepts the accessing request, and the actual process enters a stand-by (waiting) state until the preceding process has been completed. In the case when accesses to the external memory 2006 frequently occur, the bus contention occurs, and the process is set to the stand-by (waiting) state by the bus arbitration circuit 2005. As a result, the entire software processing system has a reduction in the processing speed. Therefore, the present embodiment makes it possible to avoid the bus contention, and consequently to prevent a reduction in the processing speed.

Figure 10:
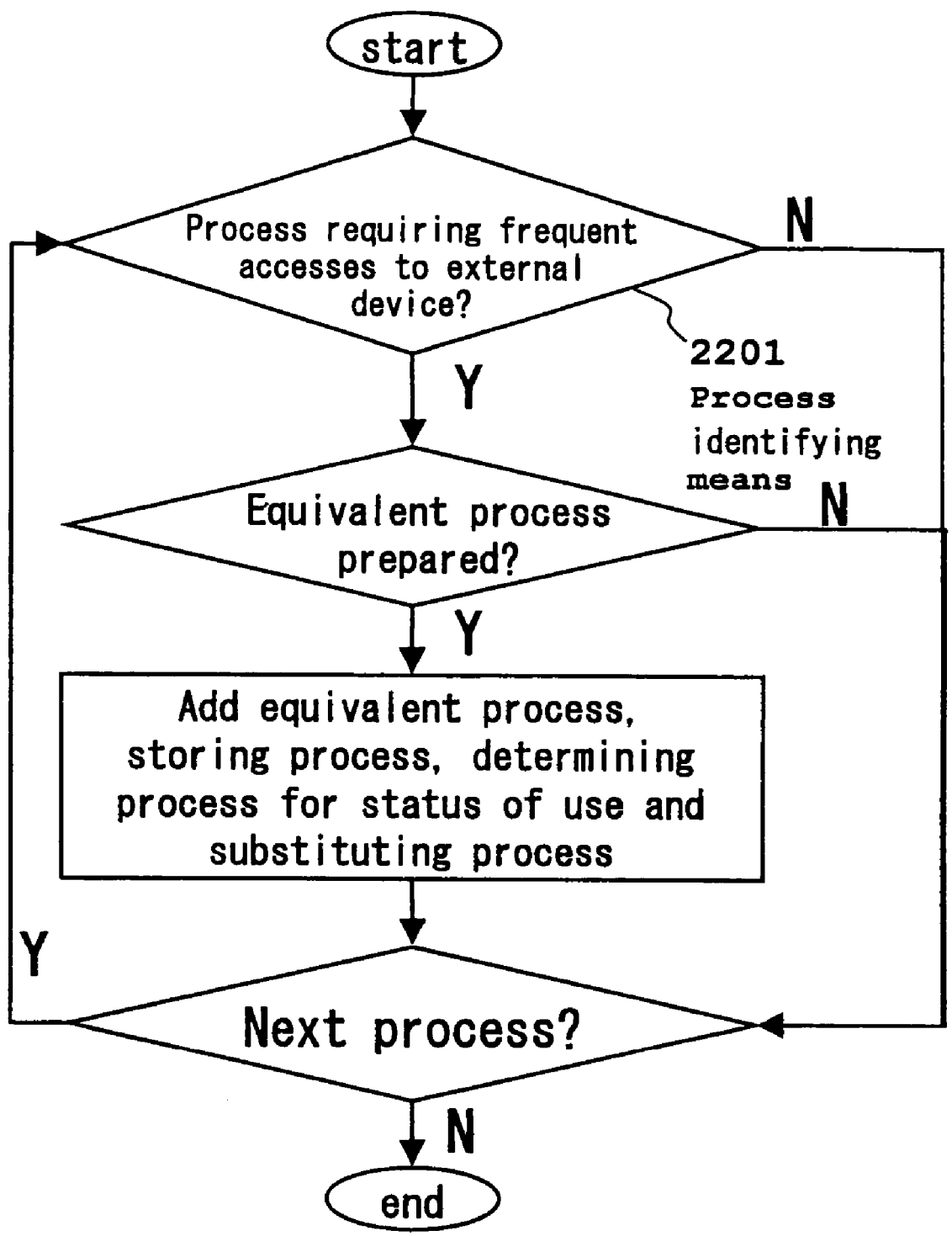
FIG. 10 shows a flow chart that represents a processing flow of a compiler in the software processing system in accordance with the second embodiment of the present invention.

In addition to functions as a normal compiler that outputs object codes from software written in a process description language, the compiler of the present embodiment also has functions shown in a process flow in FIG. 10.

The compiler, which serves as the process identifying means 2201, first identifies whether or not a process in question requires frequent accesses to the external memory 2006. This identifying operation is available when the process identifying means 2201 is allowed to preliminarily recognize processes that require accesses to the external memory 2006.

Next, the compiler determines whether or not any equivalent process that is equivalent to the identified process with high frequency of accesses, but has fewer accesses to the external memory 2006 has been preliminarily prepared in the form of a library or the like. If this has been prepared, then the compiler adds the equivalent process, a storing process, a determining process for the status of use and a substituting process to the above-mentioned identified process with high frequency of accesses.

Here, the storing process corresponds to a process which records processing time from the issuance of the processing request that requires frequent accesses to the external memory 2006 to the completion of the process. Moreover, the determining process for the status of use corresponds to a process which determines whether or not any bus contention is occurring based upon the information of the status of use stored in the storing process. Moreover, the substituting process corresponds to a process which substitutes an equivalent process for the identified process with high frequency of accesses.

FIG. 11 shows operations for altering the process requiring high frequency of accesses to the equivalent process when a compiler having a process flow shown in FIG. 10 is used (with figures on the left indicating line numbers). FIG. 11A shows processes prior to the compiler execution, and FIG. 11B shows processes after the compiler execution. Here, the process requiring high frequency of accesses to the external memory 2006 is represented by a function "mem_acs_many ( )", and the equivalent process thereof is represented by a function "mem_asc_few( )". FIG. 12 shows a determining flow with respect to bus contention in accordance with the present embodiment.

The compiler preliminarily registers processes that access the external memory 2006 so that the function "mem_acs_many( )" is identified from software by using the process identifying means 2201.

Next, the compiler adds the above-mentioned equivalent process, storing process, determining process for the status of use and substituting process to the above-mentioned identified process with high frequency of accesses. More specifically, the operations are carried out as follows:

First, in line 2 of FIG. 11B, the determining process for the status of use is added to the software. In other words, "if (task_time<DEFINED_TIME)" is added thereto. Here, "task_time" corresponds to the processing time from the issuance of the accessing request from the processor 2001 to the external memory 2006 till the completion of the process. Moreover, "DEFINED_TIME" is a preliminarily set value. With respect to the set value, it is preferable to set an accurate value in accordance with the specification of a software processing system.

Prior to the accessing process to the external memory 2006, a determination is made as to bus contention by referring to "task_time" and comparing this with "DEFINED_TIME".

Next, lines 3 to 6 of FIG. 11B represent a storing process that is carried out, when it is assumed that no bus contention is occurring by the determining process for the status of use. A variable, "start_time", is substituted by "timer_count" representing the current time. The function "mem asc_many ( )" is executed on the external memory 2006. A variable, "end_ time", is substituted by "timer_count" representing the current time. Further, referring to timer values before and after the execution of "mem_asc_many ( )", the difference between these is calculated based upon "task_time=end_time−start_ time" to obtain "task_time".

Lines from 8 to 10 of FIG. 11B represent a substituting process. In the case when it is assumed that bus contention is occurring based upon the determining process for the status of use, the process in question is substituted by an equivalent process having fewer accesses to the external memory 2006 in order to prevent further bus contention. In other words, "mem_asc_few ( )", which is an equivalent process for "mem_asc_many ( )", is executed. Preferably, the process used for this substituting process is functionally equivalent thereto in order to maintain matching between the processes, and has fewer accesses to the external memory 2006.

In the present embodiment, by using the equivalent process, the storing process, the determining process for the status of use and the substituting process that are added by the above-mentioned compiler, a process for monitoring the status of use and an altering process for software processing are achieved. In other words, the monitoring process for the status of use corresponds to a process that stores "task_time" through the storing process, and outputs "task_time" to the determining process for the status of use. Moreover, the altering process for software processing corresponds to a substituting process in which the identified process having high frequency of accesses is substituted by the equivalent process based upon "task_time".

As described above, in accordance with the above-mentioned embodiment, based upon the results of comparison between "task_time" and "DEFINED_TIME", it is determined whether or not any bus contention is occurring, and when it has been determined that bus contention is occurring, the process having high frequency of accesses to the external memory is automatically substituted by a process having fewer accesses to the external memory. As a result, it is possible to automatically assign processes while dynamically determining bus contention, and also to prevent new bus contention from occurring; thus, it becomes possible to prevent a reduction in the processing speed.

Here, the above-mentioned contents of the invention in the present embodiment are referred to as a first technique in order to make this distinct from the invention that will be described below.

In the first technique, when "task_time>DEFINDED_TIME" is satisfied, the substitution to the equivalent process is always carried out. For this reason, even after the bus contention has been actually eliminated, the determining process for the status of use might give an incorrect determination that the bus contention is continuously occurring. The purpose of the following second technique is to avoid this problem.

A determining process for the status of use, which serves as the second technique, uses random numbers in addition to the results of comparison between "task_time" and "DEFINED_TIME" that form contention information outputted from the bus arbitration circuit 2005 so as to determine bus contention.

FIG. 13 shows the probability at which the substitution to the equivalent process is carried out with respect to the ratio of "task_time" and "DEFINED_TIME". As the ratio of "task_time" and "DEFINED_TIME" increases, the probability at which the substitution to the equivalent process is carried out becomes smaller.

When "task_time" is smaller than "DEFINED_TIME" with the ratio thereof being smaller than 1, the determining process for the status of use determines that no bus contention is occurring in the same manner as the first technique so that no substitution to the equivalent process is carried out.

However, when "task_time" is not less than "DEFINED_TIME" with the ratio thereof being not less than 1, the substitution to the equivalent process is carried out in accordance with the probability shown in FIG. 13. Alternatively, the substitution to the equivalent process is not carried out, and the processing time is re-calculated, and stored.

In the first technique, when "task_time" is not less than "DEFINED_TIME", it is always determined that bus contention is occurring. In contrast, in the second technique in which the occurrence of bus contention is determined in accordance with the probability obtained by using random numbers, there is a possibility that the result of determination that no bus contention is occurring, which is reversed to the first technique, is outputted. Then, in accordance with a bus contention determining flow shown in FIG. 12, the processing time is re-recorded. In other words, by adding random numbers to the determining process for bus contention, the determination is reexamined. With this arrangement, it becomes possible to avoid the incorrect determining process for the status of use in which, although the bus contention has been actually eliminated, it is determined that the bus contention is continuously occurring.

The second technique is effectively applied to a system in which the bus contention frequently occurs in a sequence of processes. Here, the probability of the substitution to the equivalent process is made smaller as the ratio of "task_time" and "DEFINED_TIME" becomes greater; this is because, as "task_time" becomes longer, the probability that the bus contention is eliminated in the near future becomes higher.

Additionally, with respect to the value of the probability in FIG. 13, it is necessary to give a suitable value in accordance with the specification of a target system.

Thus, it becomes possible to improve the determination accuracy in bus contention in the determining process for the status of use by using the second technique.

Here, in the second technique, the probability obtained based upon random numbers is used with respect to the determination of bus contention; however, a determining process that does not use random numbers can be proposed. For example, in the case when constants, such as an average value or a maximum value, with respect to the processing periods of time at the time of bus contention, have been preliminarily known, the processing time may be re-calculated and recorded every fixed cycle after a determination has been made as bus contention.

Next, the following description discusses the third technique.

In the case when there are processes that require frequent accesses to the external memory 2006 at a plurality of portions, by determining bus contention for each of the calling ends (portions of appearance) for the processes, it becomes possible to improve the determination precision. In the third method, the processing time is stored for each of the portions of appearance of the processes with high frequency of accesses that have been identified by the process identifying means 2201, and by using the stored processing time, the determination of bus contention is carried out with high precision.

In the software processing system of FIG. 8, upon executing a function in which a plurality of processes are described, the processing of the function is executed after the current program counter has been temporarily saved in a save register. After completion of the processing of the function, the program counter is read from the save register so that the program counter is returned to its original value. In the third technique, the identifying process for the portions of appearance reads the program counter from the above-mentioned save register so as to specify the portions of appearance of the processes with high frequency of accesses that have been identified by the process identifying means 2201.

Figure 14:
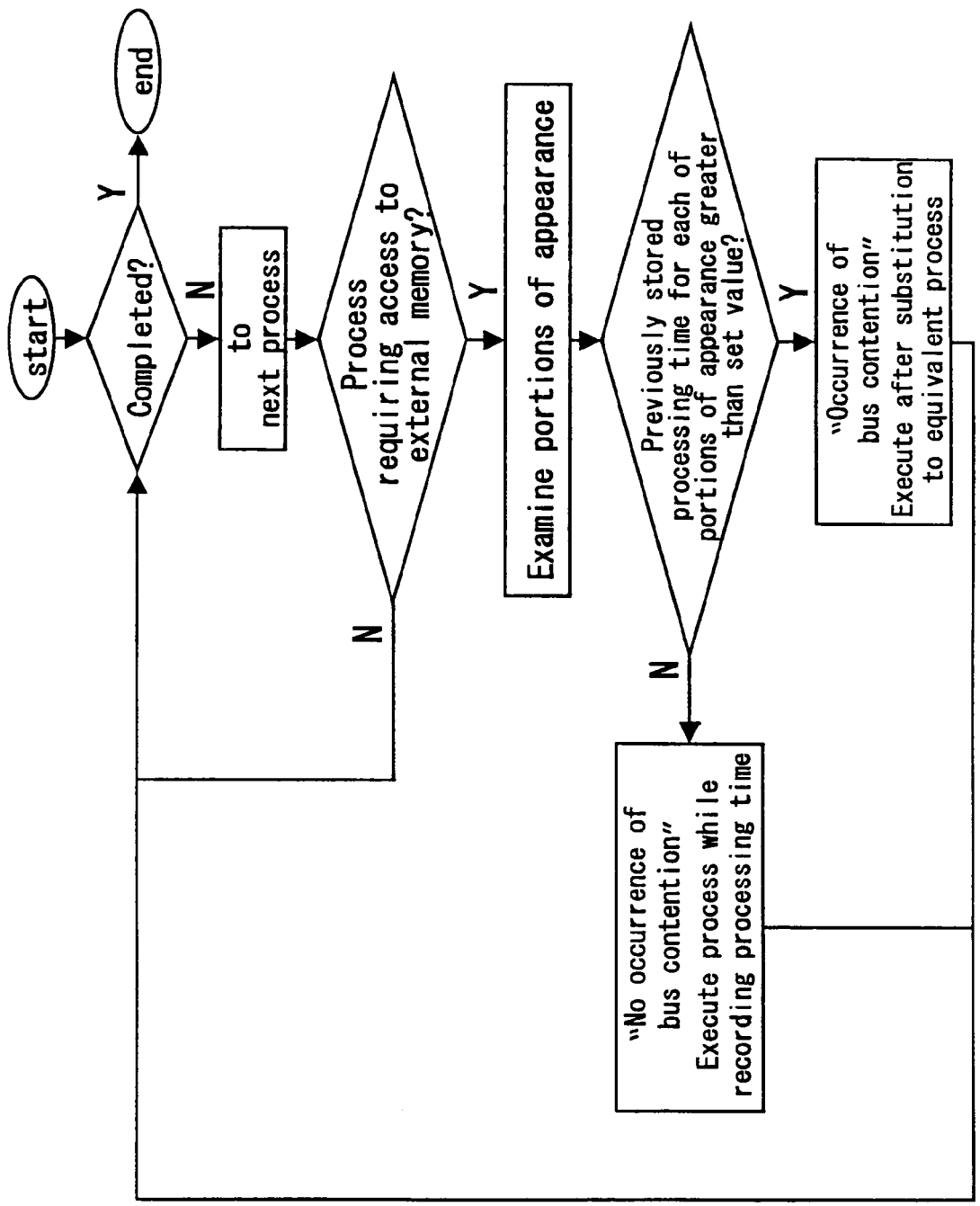
FIG. 14 shows a flow chart that represents a determining flow of bus contention in which positions of appearance are taken into consideration in the software processing system in accordance with the second embodiment of the present invention.

FIG. 14 shows a determination flow for bus contention in which the identifying process for portions of appearance is added to the first technique having the determination flow of FIG. 12.

First, with respect to the processes with high frequency of accesses that have been identified by the process identifying means 2201, the portions of appearance of the processes are examined by an identifying process of the portions of appearance. The portions of appearance can be identified by reference to the save register as described above.

Next, the stored processing time is found for each of the portions of appearance. The stored processing time is compared to a preset value for each of the portions of appearance so that it is determined whether or not any bus contention is occurring; thus, if any bus contention is occurring, then the corresponding process is replaced by an equivalent process and the process is executed. If no bus contention is occurring, the above-mentioned identified process with high frequency of accesses, as it is, is executed while storing the processing time. Here, in the case when no processing time is stored at a portion for storing the processing time for each of the portions of appearance, this case is regarded as no occurrence of bus contention. In this case, the above-mentioned process with high frequency of accesses, identified by the process identifying means 2201, is executed while measuring the processing time, and the measured processing time is newly stored.

In the third technique, in the case when the same process is carried out repeatedly in a process such as a loop process, by referring to the processing time that has been determined for each of the portions of appearance, it becomes possible to improve the determination precision for bus contention.

Figure 15:
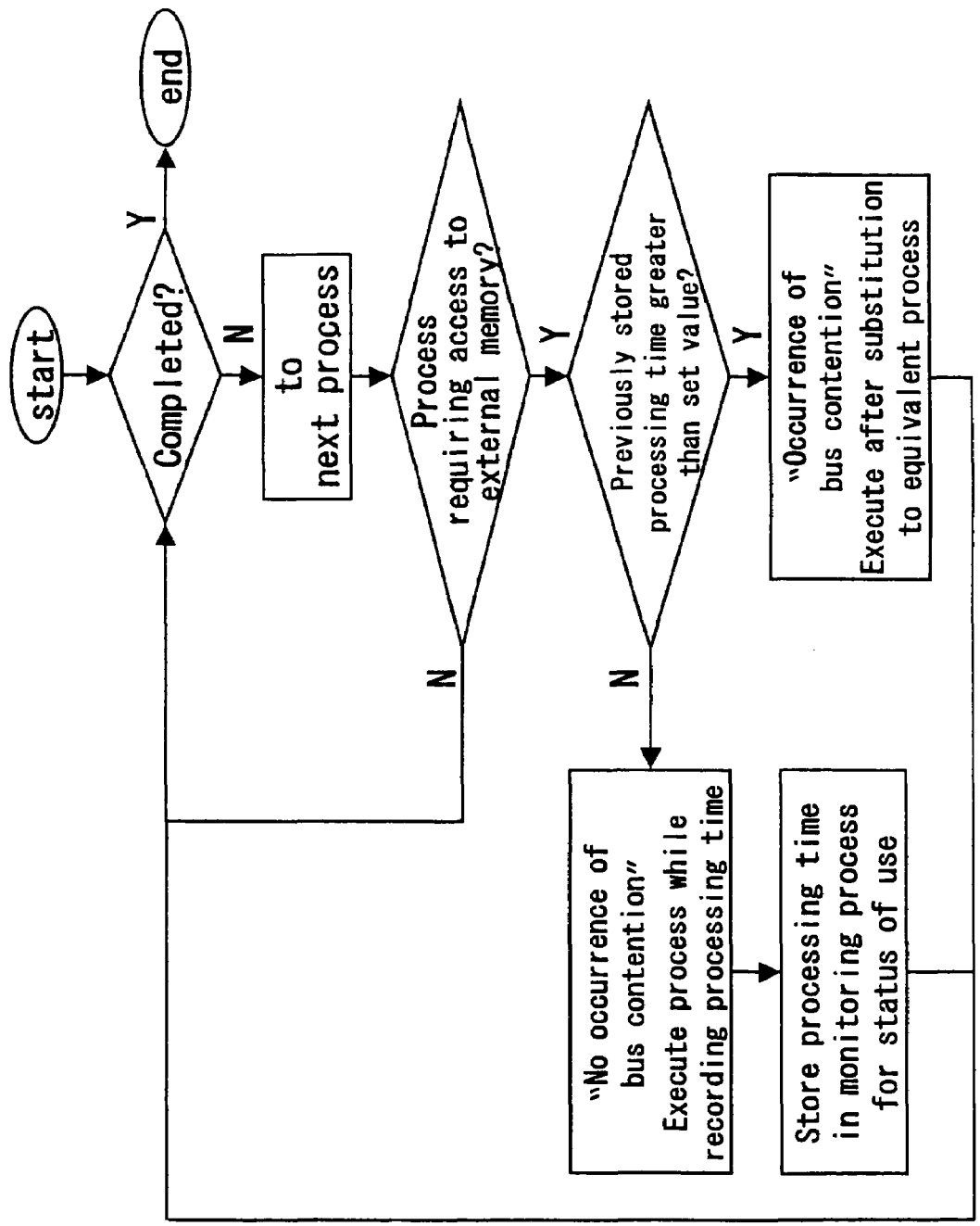
FIG. 15 shows a flow chart that represents a determining flow of bus contention in the software processing system in accordance with the second embodiment of the present invention.

Here, "task_time" in the present embodiment can be stored in the monitoring device for the status of use in the first embodiment so that the determination for bus contention may be carried out. FIG. 15 shows a determination flow for bus contention in this case. After finding the processing time, the processing time is also stored in the monitoring device for the status of use so that it becomes possible to dynamically determine bus contention, and consequently to prevent a reduction in the processing speed due to bus contention.

Third Embodiment

Figure 16:
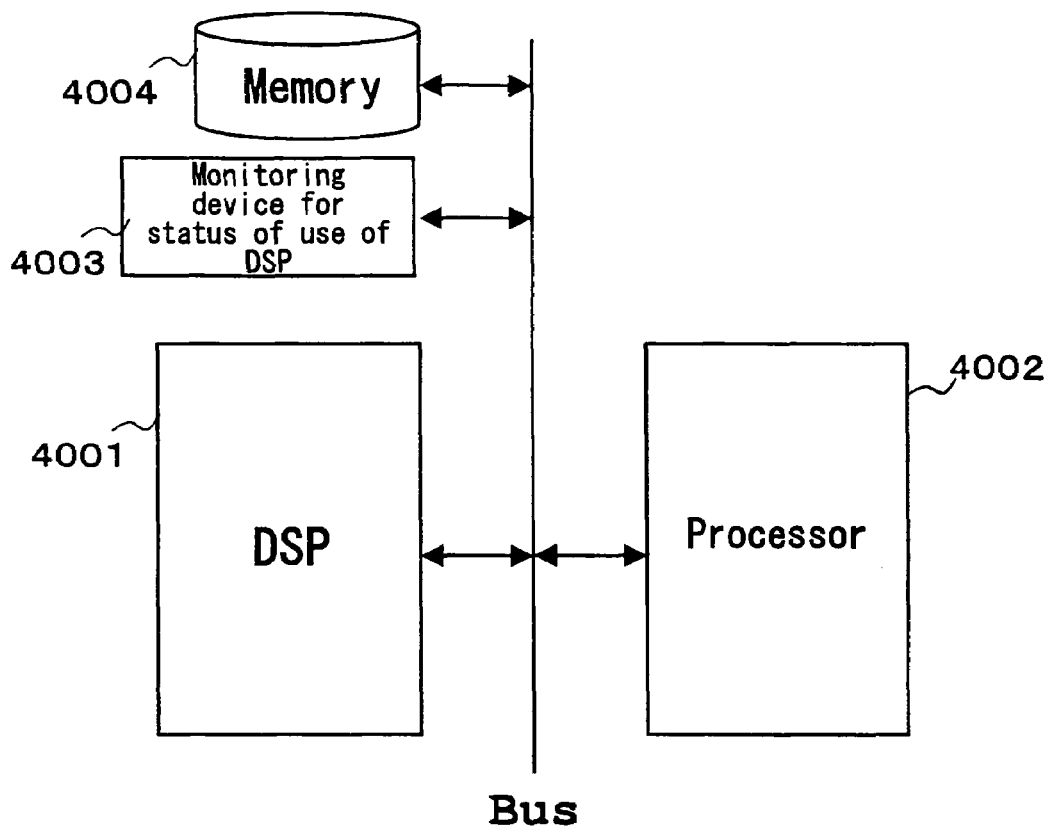
FIG. 16 is a block diagram that shows a hardware structure of a software processing system in accordance with a third embodiment of the present invention.

FIG. 16 is a block diagram that shows a hardware structure of a software processing system in accordance with the third embodiment. The software processing system is constituted by a DSP 4001, a processor 4002, a monitoring device 4003 for the status of use of the DSP and a memory 4004. The memory 4004 stores an object code 4105 shown in FIG. 17 as a process to be executed by the DSP 4001 and the processor 4002. The memory 4004, which serves as a shared memory when the DSP 4001 and the processor 4002 execute the process, stores the results of process and the processing data.

The processor 4002 controls the DSP 4001 through a rejecting control system. In the case when the processor 4002 allows the DSP 4001 to execute software read from the memory 4004, the processor 4002 issues a request for the process to the DSP 4001, and upon receipt of the processing request, the DSP 4001 executes the corresponding process. The monitoring device 4003 for the status of use of the DSP is a register (storing device) which stores the status as to whether or not the DSP 4001 is currently executing any process, and since specific addresses are assigned thereto, this can be read from the software processing.

Figure 17:
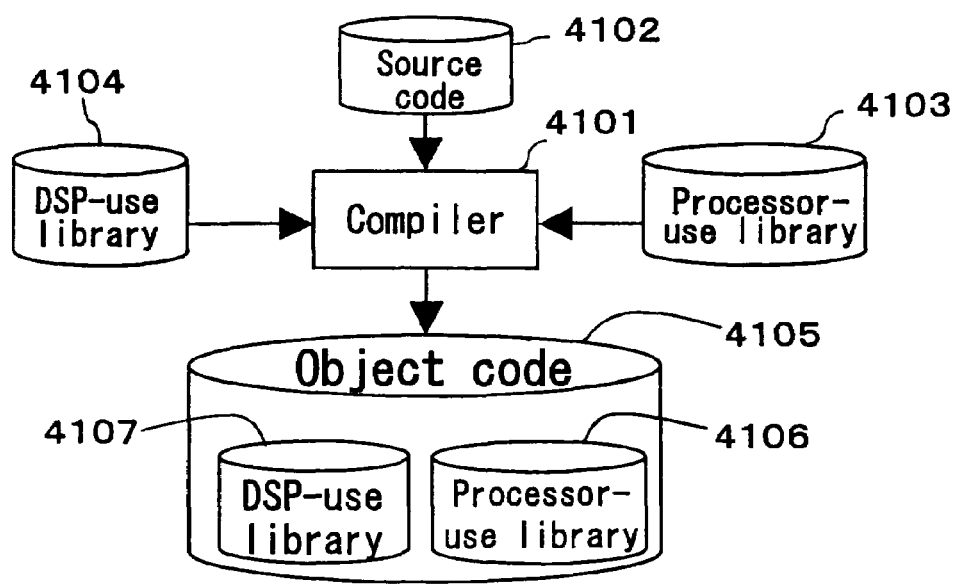
FIG. 17 shows a flow chart that represents a processing flow of a compiler in the software processing system in accordance with the third embodiment of the present invention.

In FIG. 17 that shows a flow of a software compiler, a source code 4102 that is written in a processing description language such as C language is converted to an object code 4105 by using a processor-use library 4103 and a DSP-use library 4104. As a result, the object code 4105 includes a processor-use library 4106 and a DSP-use library 4107 that are required for execution.

In addition to functions as a normal compiler that generate object codes from the processing description language, the compiler is provided with a process identifying means which identifies processes to be executed by the DSP 4001 from the source code 4102, and a process addition means which adds a specific process to the process identified by the process identifying means.

Figures 18A, 18B:
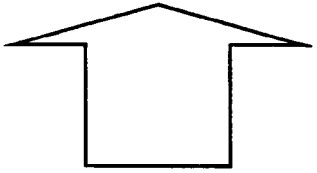
FIG. 18A and FIG. 18B show an alteration of processes carried out by a compiler in the software processing system in accordance with the third embodiment of the present invention.

FIG. 18 shows an alteration of processes carried out by the process identifying means and the process addition means. Here, the source code of FIG. 18A, written in the processing description language, represents processes that have been identified from the source code 4102 by the process identifying means as processes to be executed by the DSP 4001. In other words, all the processes, represented by functions, "func1 ( )", "func2 ( )" and "func3 ( )", are processes to be executed by the DSP 4001. Here, by preliminarily registering processes to be executed by the DSP 4001 in the process identifying means, processes to be executed by the DSP 4001 can be identified from the source code.

The source code shown in FIG. 18B indicates processes that have been added by the process addition means. Here, with respect to func1 and func 3 also, the process addition means adds specific processes thereto in the same manner as func 2.

The specific processes to be added by the process addition means refer to the identifying process for the status of use and the substituting process. The identifying process for the status of use is a process for identifying whether or not the DSP 4001 is currently executing any process by referring to the monitoring device 4003 for the status of use for the DSP. In FIG. 18B, "if (waiting state in DSP)" in line 8 corresponds to the identifying process for the status of use. In this case, the waiting state corresponds to a state in which the DSP 4001 is not executing any process, and is waiting for a processing request given by the processor 4002. In FIG. 18B, as shown in lines from 9 to 11, with respect to the process contents in func2, "func2_dsp( )" is given when the DSP-use library 4104 is used, and "func2_cpu( )" is given when the processor-use library 4103 is used. These are processes having the same function.

Figure 19:
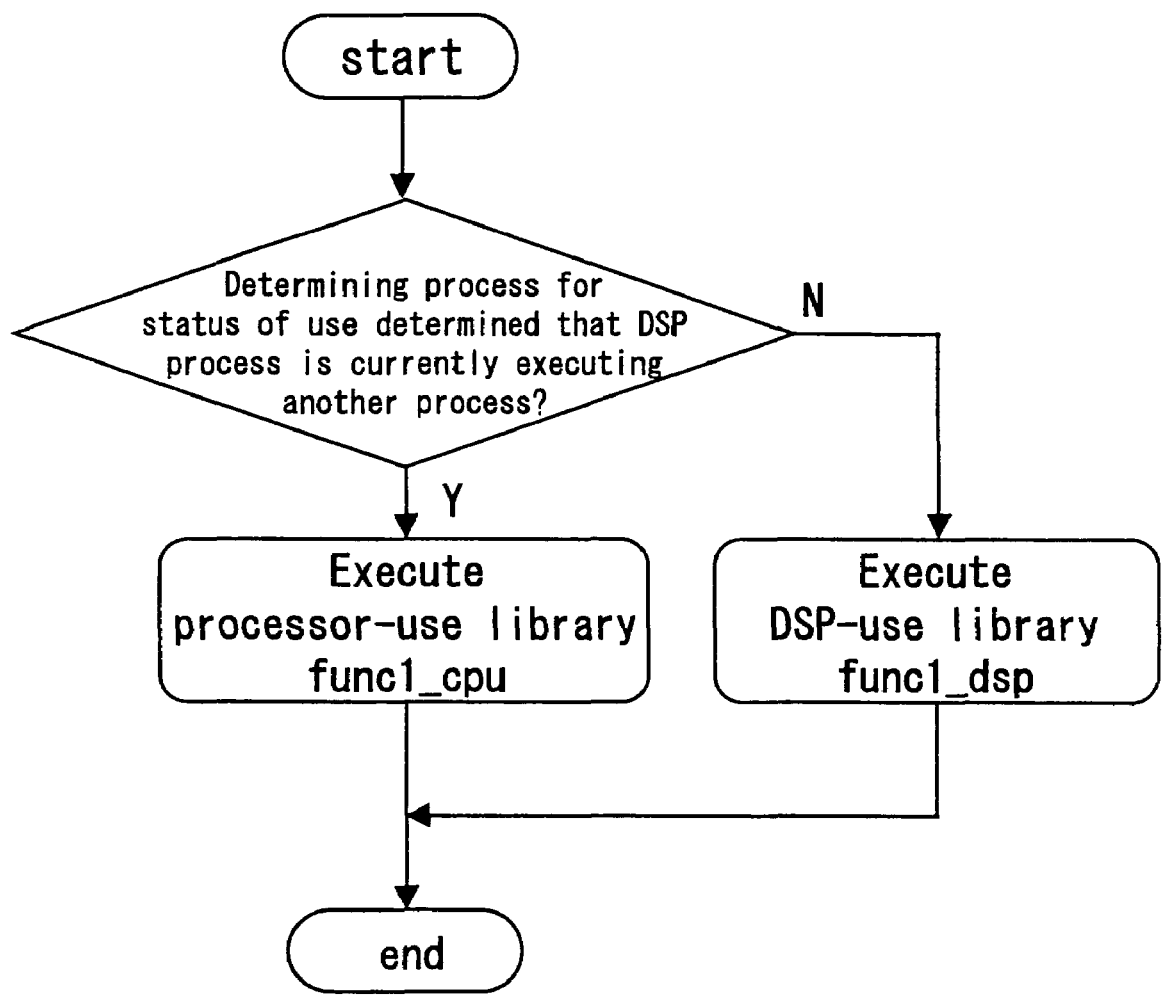
FIG. 19 shows a flow chart that represents a determining flow of DSP contention in the software processing system in accordance with the third embodiment of the present invention.

In other words, the process in question is identified as to whether or not it is a process that needs to use the DSP 4001, and prior to the execution of the process, by observing the monitoring device 4003 for the status of use of the DSP, the status of the DSP 4001 is determined. Upon receipt of the result of the determination, when the DSP 4001 is in the waiting state, the DSP 4001, as it is, is used to execute the process. However, when the DSP 4001 is executing another process, the process is replaced by another process that does not use the DSP 4001. This altering process for software processing makes it possible to avoid DSP contention. For reference, FIG. 19 shows a determination flow for the DSP contention.

Next, referring to FIG. 20, the following description discusses a specific example of a flow of processes.

Figure 20A:
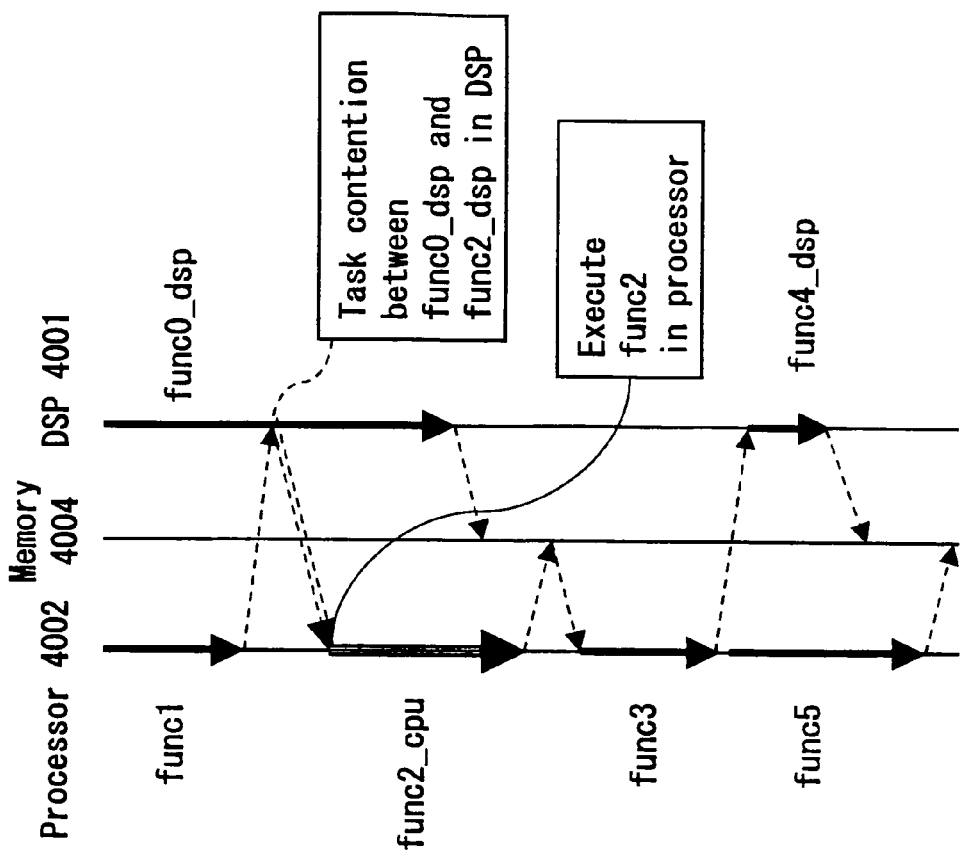
FIG. 20A and FIG. 20B are sequential diagrams that show a flow of processes in the software processing system in accordance with the third embodiment of the present invention.

FIG. 20A shows a flow of processes in which no DSP contention occurs. The software includes processes of func0, func1, func2, func3, func4, func5 and func6. With respect to func0, func2 and func4, processing requests are issued from the processor 4002 to the DSP 40 so that func0_dsp, func2_dsp and func4_dsp are executed on the DSP 4001 by using the DSP-use library 4104. The DSP 4001 and the processor 4002 pass the results of processing to each other by using the shared memory. Here, func0_dsp, func2_dsp, func4_dsp and func5 store the results of processing in the shared memory 4004. The results of processing thus stored are read out when func3 and func6 execute the processes.

In the case when no DSP contention occurs as shown in FIG. 20A, the process is executed while using the resource of the processor 4002 and the DSP 4001 without losses.

Figure 20B:
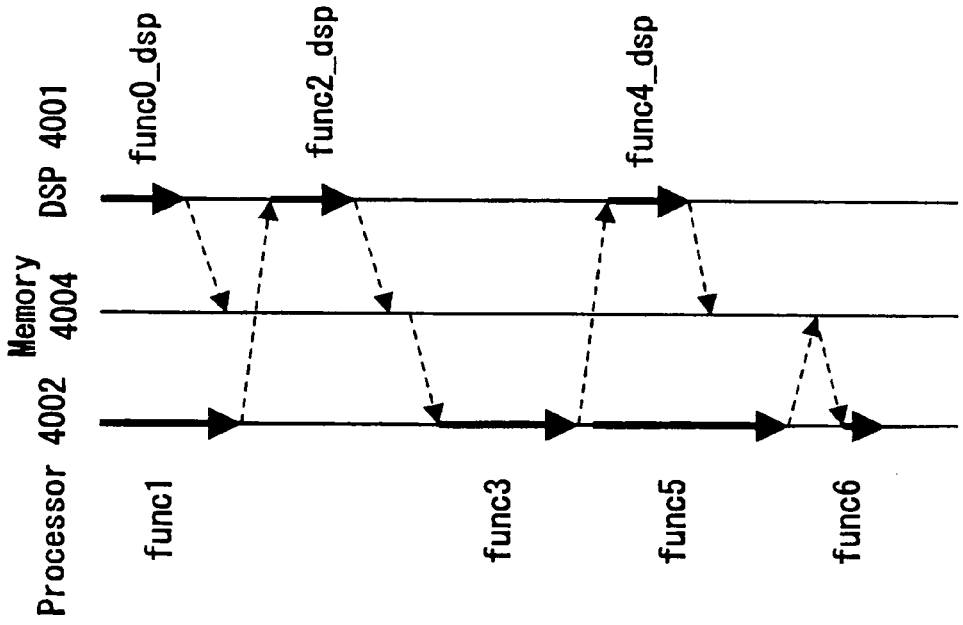

However, as shown in FIG. 20B, when the processing time of func0_dsp takes longer so that prior to the completion of the process, func1 issues a processing request for func2_dsp, a DSP contention occurs. In this case, the process of func2_dsp is not started until the process of func0_dsp has been completed. Consequently, the process of func3, which uses the result of processing of func2_dsp, is no longer executed, with the result that there is a delay in the processing speed in the entire processes.

Therefore, in the present embodiment, when func1 issues the processing request for func2_dsp, the monitoring device 4003 for the status of use of the DSP is observed. When, as a result, any DSP contention is recognized, the process of func2_cpu, which has a function equivalent to func2, and executes processes not on the DSP 4001, but on the processor 4002, is executed in place of func2_dsp. In other words, an altering process for software processing is used so that, upon issuing a processing request for the process to be executed by the DSP 4001, the status of the DSP 4001 is monitored and the processes are appropriately assigned to the DSP 4001 or the processor 4002. Thus, it becomes possible to prevent DSP contention, and consequently to prevent a reduction in the processing speed. Moreover, by appropriately assigning processes, the processor 4002, which is in a waiting state, can be used so that it becomes possible to use the resources more efficiently.

Here, the process identifying means and the process addition means of the present embodiment causes an increase in the number of processing cycles; however, without the necessity of adding a new hardware device except for the monitoring device 4003 for the status of use of the DSP, it becomes possible to avoid DSP contention and also to prevent a reduction in the processing speed.

Fourth Embodiment

Referring to FIGS. 21 to 28, the following description discusses a software processing system in accordance with a fourth embodiment of the present invention.

Figure 21:
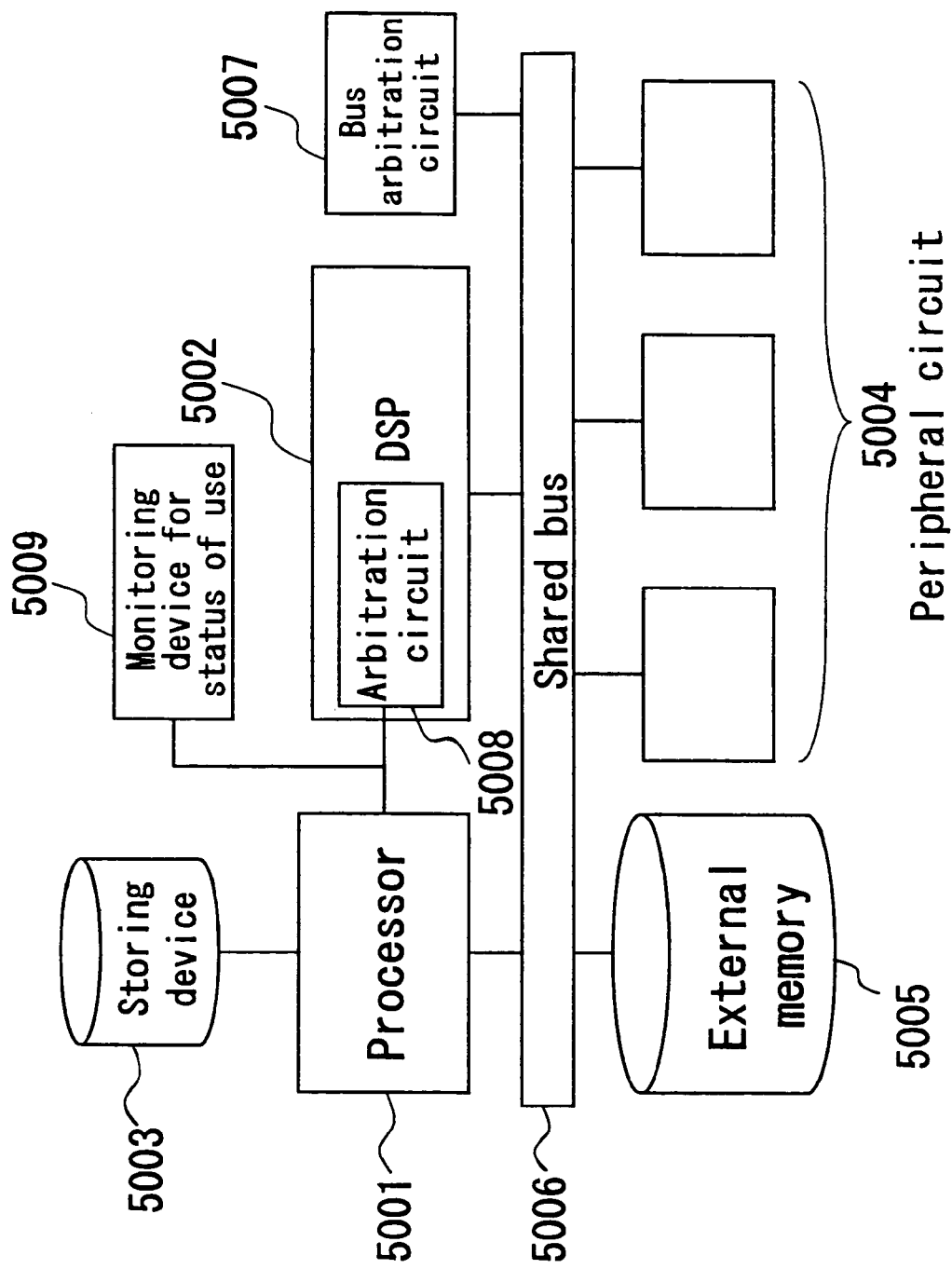
FIG. 21 is a block diagram that shows a hardware structure of a software processing system in accordance with a fourth embodiment of the present invention.

FIG. 21 is a block diagram that shows a hardware structure of a software processing system. The software processing system is constituted by a processor 5001, a DSP 5002, a storing device 5003 that stores software that is executed by the processor 5001 and the DSP 5002, a peripheral circuit 5004, a bus arbitration circuit 5007, an external memory 5005, a shared bus 5006, an arbitration circuit 5008 and a monitoring device 5009 for the status of use.

The processor 5001 controls the DSP 5002 through a rejecting control system. In the case when software read by the processor 5001 from the storing device 5003 corresponds to a process to be executed by the DSP 5002, the processor 5001 issues a processing request to the DSP 5002, and upon receipt of the processing request, the DSP 5002 executes the corresponding process. The external memory 5005 is a shared memory that is used when the processor 5001 and DSP 5002 execute the process. The DSP 5002 has a built-in bus-arbitration circuit 5008. When a new processing request is issued while the DSP 5002 is in operation, that is, when a DSP contention occurs, the bus arbitration circuit 5008 determines whether or not the newly issued process can be executed. Moreover, the monitoring device 5009 for the status of use monitors the status of use of the DSP 5002, and outputs the status of use in response to the request.

Figure 22:
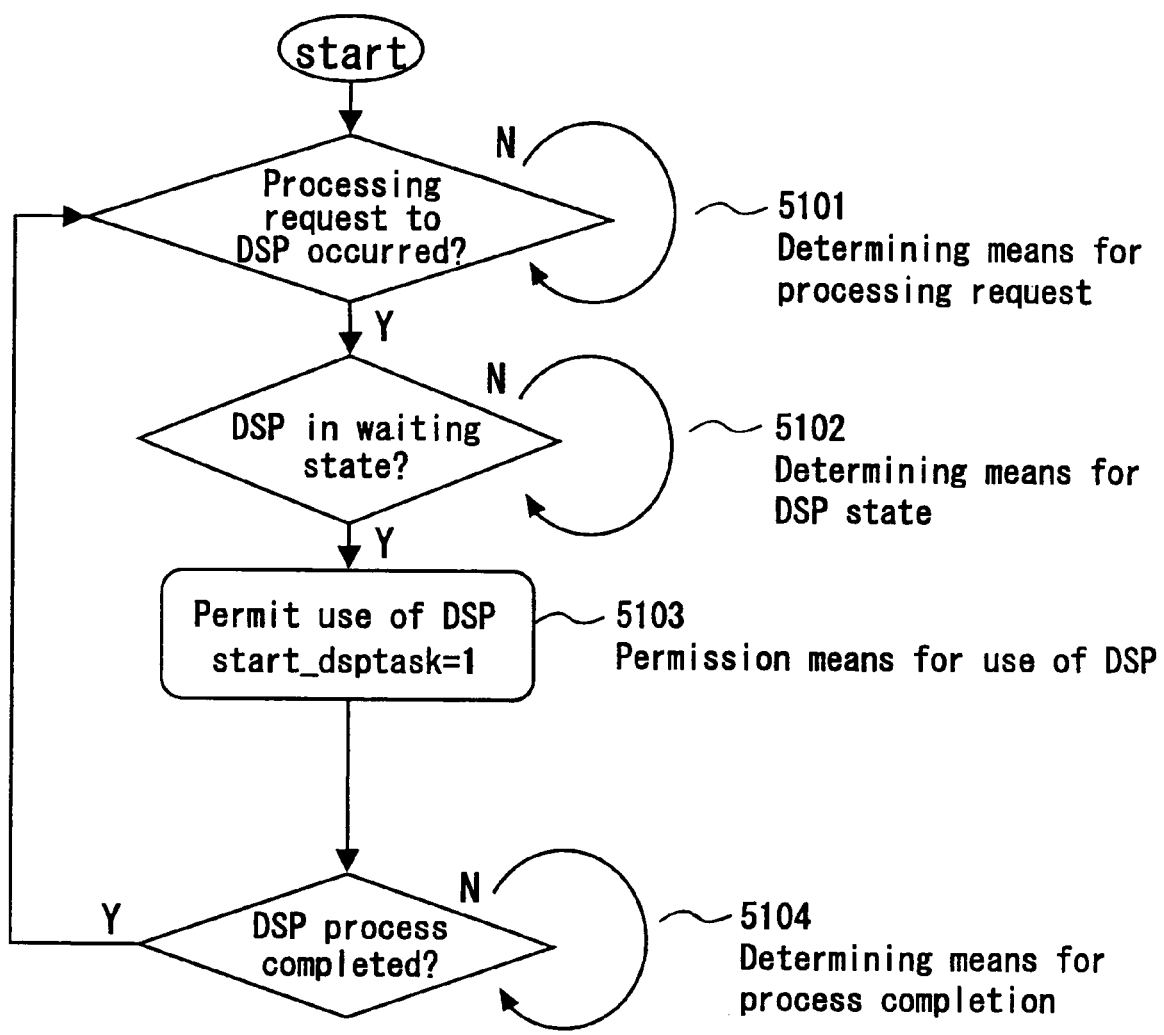
FIG. 22 shows a flow chart that represents a control flow of a bus arbitration circuit in the software processing system in accordance with the fourth embodiment of the present invention.

FIG. 22 shows a controlling flow of the arbitration circuit 5008. Reference numeral 5101 represents a determining means for a processing request, which determines whether or not a processing request for a process to be executed by the DSP 5002 is given. Reference numeral 5102 represents a determining means for a DSP status, which determines whether or not the DSP 5002 is in a waiting state for a processing request from the processor 5001. Reference numeral 5103 represents a permission means used for the DSP, which allows the DSP 5002 to execute the corresponding process in response to a processing request. Reference numeral 5104 represents a determining means for process completion which determines whether or not the process has been completed.

When, upon executing the process in the DSP 5002, another processing request is given to the DSP 5002, that is, when a DSP contention occurs, the arbitration circuit 5008 once accepts the processing request, and the actual process enters a stand-by (waiting) state until the preceding process has been completed. In the case when processes to be executed by the DSP 5002 frequently occur, the DSP contention occurs, and the process is set to the stand-by (waiting) state by the arbitration circuit 5008. As a result, the entire software processing system has a reduction in the processing speed. Therefore, the present embodiment makes it possible to avoid the DSP contention, and consequently to prevent a reduction in the processing speed.

As shown in FIG. 23, the compiler, which serves as the process identifying means 5201, first identifies whether or not a process in question needs to be executed by the DSP 5002. This identifying operation is available when the process identifying means 5201 is allowed to preliminarily recognize processes that need to be executed by the DSP.

Next, with respect to the process that has been identified as a process to be executed by the DSP, the compiler determines whether or not any equivalent process that is functionally equivalent to the process, but is executed by the processor 5001, has been preliminarily prepared in the form of a library or the like. If this has been prepared, then the compiler adds the equivalent process, a storing process, a determining process for the status of use and a substituting process to the above-mentioned identified process to be executed by the DSP.

Here, the storing process corresponds to a process which records waiting time from the issuance of the processing request for executing the process in the DSP 5002 to the start of the corresponding process. Moreover, the determining process for the status of use corresponds to a process which determines whether or not any DSP contention is occurring based upon the information of the status of use stored through the storing process. Moreover, the substituting process corresponds to a process which substitutes an equivalent process for the identified process to be executed by the above-mentioned DSP.

Figure 25:
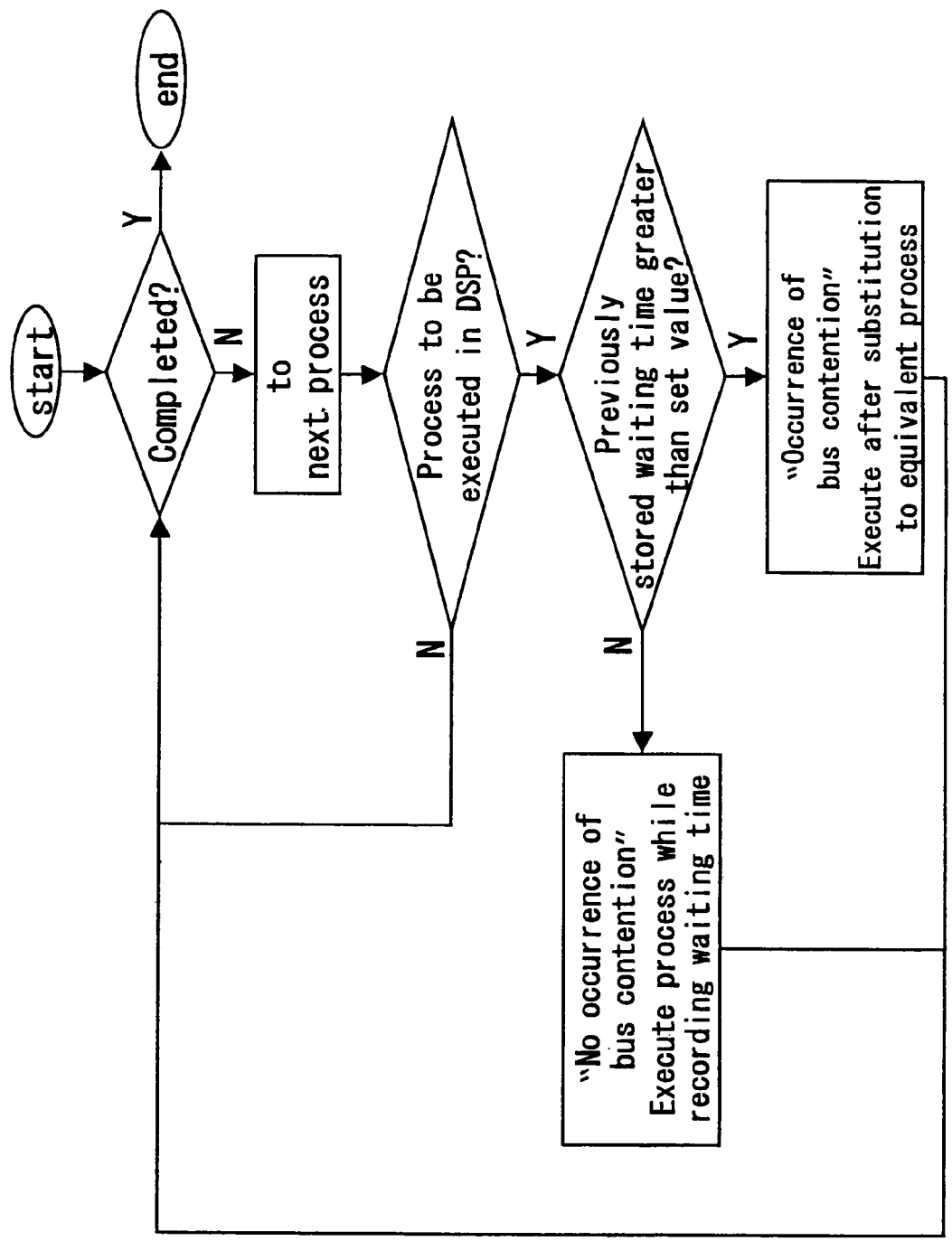
FIG. 25 shows a flow chart that represents a determining flow of DSP contention in the software processing system in accordance with the fourth embodiment of the present invention.

FIG. 24 shows operations for alternating the process to be executed by the DSP 5002 to the equivalent process when a compiler having a process flow shown in FIG. 23 is used. FIG. 24A shows processes prior to the compiler execution, and FIG. 23B shows processes after the compiler execution. Here, the process to be executed by the DSP 5002 is represented by a function "dsp_task( )", and the equivalent process thereof is represented by a function "proc_dsptask( )". FIG. 25 shows a determining flow with respect to DSP contention in accordance with the present embodiment.

The compiler preliminarily registers processes to be executed by the DSP 5002 so that the function "dsp_task( )" is identified from software by using the process identifying means 5201.

Next, the compiler adds the above-mentioned equivalent process, storing process, determining process for the status of use and substituting process to the above-mentioned identified process to be executed by the DSP. More specifically, the operations are carried out as follows:

First, in line 2 of FIG. 24B, the determining process for the status of use is added to the software. In other words, "if (wait_time<DEFINED_TIME)" is added thereto. Here, "wait_time" corresponds to the processing time from the issuance of the processing request for a process to be executed by the DSP 5002 from the processor 5001 till the start of the process. Moreover, "DEFINED_TIME" is a preliminarily set value. With respect to the set value, it is preferable to set an accurate value in accordance with the specification of a software processing system.

The waiting time "wait_time" represents the waiting time for the process to be executed by the DSP5002, which occurred previously. Prior to the issuance of the request for a process to be executed by the DSP5002 that is currently occurring, a determination is made as to DSP contention by referring to "wait_time" and comparing this with "DEFINED_TIME".

Next, lines from 3 to 6 of FIG. 24B represent a storing process that is carried out when it is assumed that no DSP contention occurs by the determining process of the status of use. A variable, "start_time", is substituted by "timer_count" representing the current time. The sequence enters a waiting state until the start of the DSP process. A variable, "end_time", is substituted by "timer_count" representing the current time. Further, referring to timer values at the time of issuance of the processing request and at the time of start of "dsp_task ( )", the difference between these is calculated based upon "wait_time=end_time−start_time" to obtain "wait_time".

Lines from 9 to 11 of FIG. 24B represent a substituting process. In the case when it is assumed that DSP contention is occurring based upon the determining process of the status of use, the process in question is substituted by an equivalent process to be executed by the processor 5001 in order to prevent further DSP contention. In other words, "proc_dsptask( )", which is an equivalent process for "dsp_task ( )", is executed. Preferably, the process used for this substituting process is functionally equivalent thereto in order to maintain matching between the processes; however, the process is preferably prepared as a process that is not executed by DSP 5002.

In the present embodiment, by using the equivalent process, the storing process, the determining process for the status of use and the substituting process that are added by the above-mentioned compiler, a process for monitoring the status of use and an altering process for software processing are achieved. In other words, the monitoring process for the status of use corresponds to a process that stores "wait_time" through the storing process, and outputs "wait_time" to the determining process for the status of use. Moreover, the altering process for software processing corresponds to a substituting process in which the identified process to be executed by the DSP is substituted by the equivalent process based upon "wait_time".

As described above, in accordance with the present embodiment, based upon the results of comparison between "wait_time" and "DEFINED_TIME", it is determined whether or not any DSP contention is occurring, and when it has been determined that a DSP contention is occurring, the process to be executed by the DSP 5002 is automatically substituted by a process to be executed by the processor 5001. As a result, it is possible to automatically assign processes while dynamically determining DSP contention, and also to prevent new DSP contention from occurring; thus, it becomes possible to prevent a reduction in the processing speed.

Here, the above-mentioned contents of the invention in the present embodiment are referred to as a fourth technique in order to make this distinct from the invention that will be described below.

In the fourth technique, when "wait_time >DEFINDED_TIME" is satisfied, the substitution to the equivalent process is always carried out. For this reason, even after the DSP contention has been actually eliminated, the determining process for the status of use might give an incorrect determination that the DSP contention is continuously occurring. The purpose of the following fifth technique is to avoid this problem.

A determining process for the status of use, which serves as the fifth technique, uses random numbers in addition to the results of comparison between "wait_time" and "DEFINED_TIME" that form contention information outputted from the monitoring device for the status of use so as to determine DSP contention.

FIG. 26 shows the probability at which the substitution to the equivalent process is carried out with respect to the ratio of "wait_time" and "DEFINED_TIME". When "wait_time" is smaller than "DEFINED_TIME" with the ratio thereof being smaller than 1, the determining process for the status of use determines that no DSP contention is occurring, in the same manner as the fourth technique, so that no substitution to the equivalent process is carried out.

However, when "wait_time" is not less than "DEFINED_TIME" with the ratio thereof being not less than 1, the substitution to the equivalent process is carried out in accordance with the probability shown in FIG. 26. Alternatively, the substitution to the equivalent process is not carried out, and the waiting time is re-calculated, and stored.

In the fourth technique, when "wait_time" is not less than "DEFINED_TIME", it is always determined that DSP contention is occurring. In contrast, in the fifth technique in which the occurrence of DSP contention is determined in accordance with the probability obtained by using random numbers, there is a possibility that the result of determination that no DSP contention is occurring, which is reversed to the fourth technique, might be outputted. Then, in accordance with a DSP contention determining flow shown in FIG. 25, the waiting time is re-recorded. In other words, by adding random numbers to the determining process for DSP contention, the determination is reexamined. With this arrangement, it becomes possible to avoid the incorrect determining process for the status of use in which, although the bus contention has been actually eliminated, it is determined that the DSP contention is continuously occurring.

The fifth technique is effectively applied to a system in which the DSP contention frequently occurs in a sequence of processes. Here, the probability of the substitution to the equivalent process is made smaller as the ratio of "wait_time" and "DEFINED_TIME" becomes greater; this is because, as "wait_time" becomes longer, the probability that the bus contention is eliminated in the near future becomes higher.

Additionally, with respect to the value of the probability in FIG. 26, it is necessary to give a suitable vale in accordance with the specification of a target system.

Thus, it becomes possible to improve the determination accuracy in DSP contention in the determining process for the status of use by using the fifth technique.

Here, in the fifth technique, the probability obtained based upon random numbers is used with respect to the determination of bus contention; however, a determining process that does not use random numbers can be proposed. For example, in the case when constants, such as an average value or a maximum value, with respect to the waiting periods of time at the time of DSP contention, have been preliminarily known, the waiting time may be re-calculated and recorded every fixed cycle after a determination has been made as DSP contention.

Next, the following description discusses the sixth technique.

In the case when there are processes to be executed by the DSP 5002 at a plurality of portions, by determining DSP contention for each of the calling ends (portions of appearance) for the processes, it becomes possible to improve the determination precision. In the sixth method, the waiting time is stored for each of the portions of appearance of the processes to be executed by the DSP that have been identified by the process identifying means 5201, and by using the stored waiting time, the determination of DSP contention is carried out with high precision.

In the software processing system of FIG. 21, upon executing a function in which a plurality of processes are described, the processing of the function is executed after the current program counter has been temporarily saved in a save register. After completion of the processing of the function, the program counter is read from the save register so that the program counter is returned to its original value. In the sixth technique, the identifying process for the portions of appearance reads the program counter from the above-mentioned save register so as to specify the portions of appearance of the processes to be executed by the DSP that have been identified by the process identifying means 5201.

Figure 27:
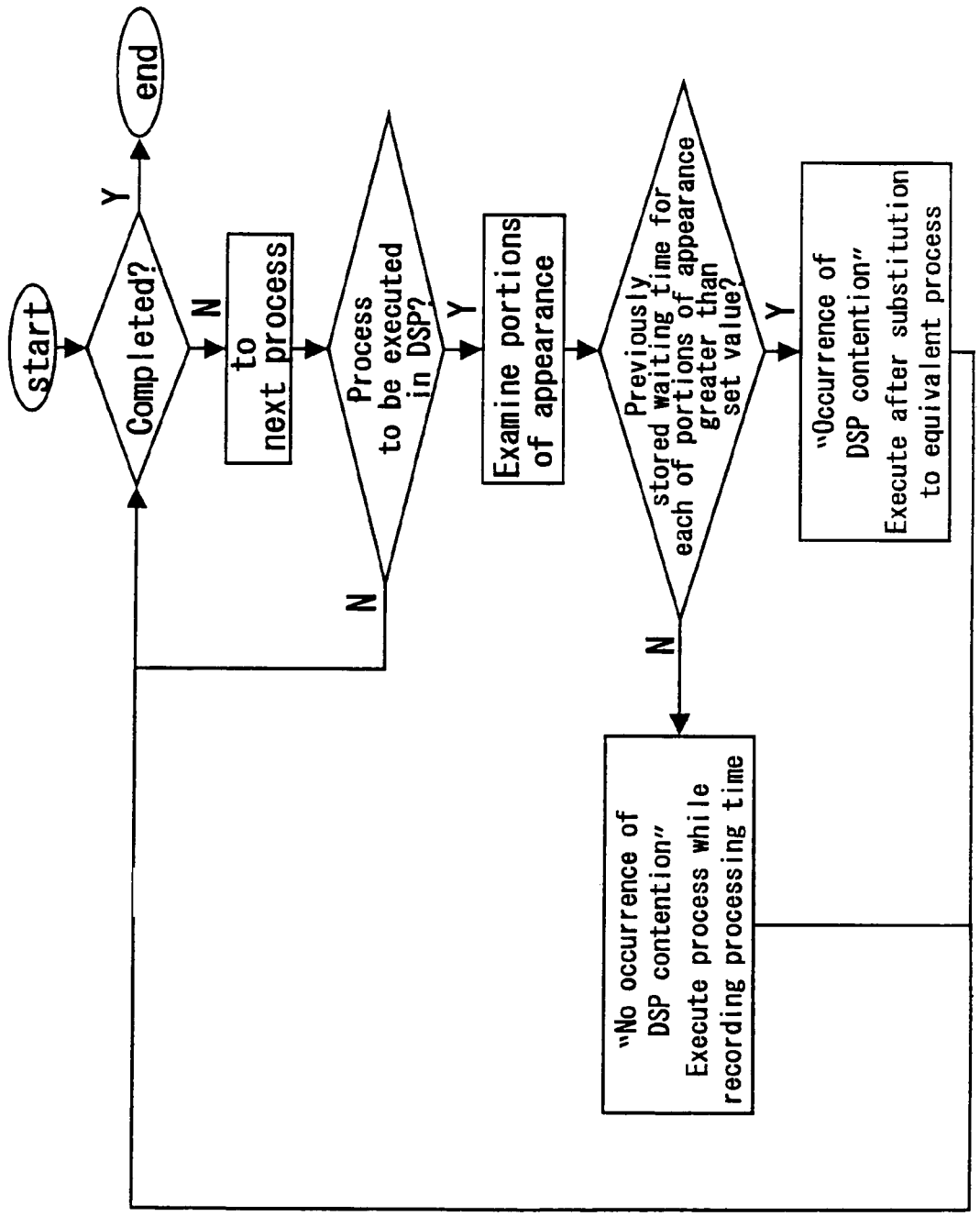
FIG. 27 shows a flow chart that represents a determining flow of DSP contention in which positions of appearance are taken into consideration in the software processing system in accordance with the fourth embodiment of the present invention.

FIG. 27 shows a determination flow for DSP contention in which the identifying process for portions of appearance is added to the fourth technique having the determination flow of FIG. 25.

First, with respect to the processes to be executed by the DSP that have been identified by the process identifying means 5201, the portions of appearance of the processes are examined by an identifying process of the portions of appearance. The portions of appearance can be identified by reference to the save register as described above.

Next, the stored waiting time is found for each of the portions of appearance. The stored waiting time is compared to a preset value for each of the portions of appearance so that it is determined whether or not any DSP contention is occurring; thus, if any DSP contention is occurring, then the corresponding process is replaced by an equivalent process and the process is executed. If no DSP contention is occurring, the above-mentioned identified process to be executed by the DSP, as it is, is executed while storing the waiting time. Here, in the case when no waiting time is stored at a portion for storing the waiting time for each of the portions of appearance, this case is regarded as no occurrence of DSP contention. In this case, the above-mentioned process to be executed by the DSP, identified by the process identifying means 5201, is executed while measuring the waiting time, and the measured waiting time is newly stored.

In the sixth technique, in the case when the same process is carried out repeatedly in a process such as a loop process, by referring to the waiting time that has been determined for each of the portions of appearance, it becomes possible to improve the determination precision for DSP contention.

Figure 28:
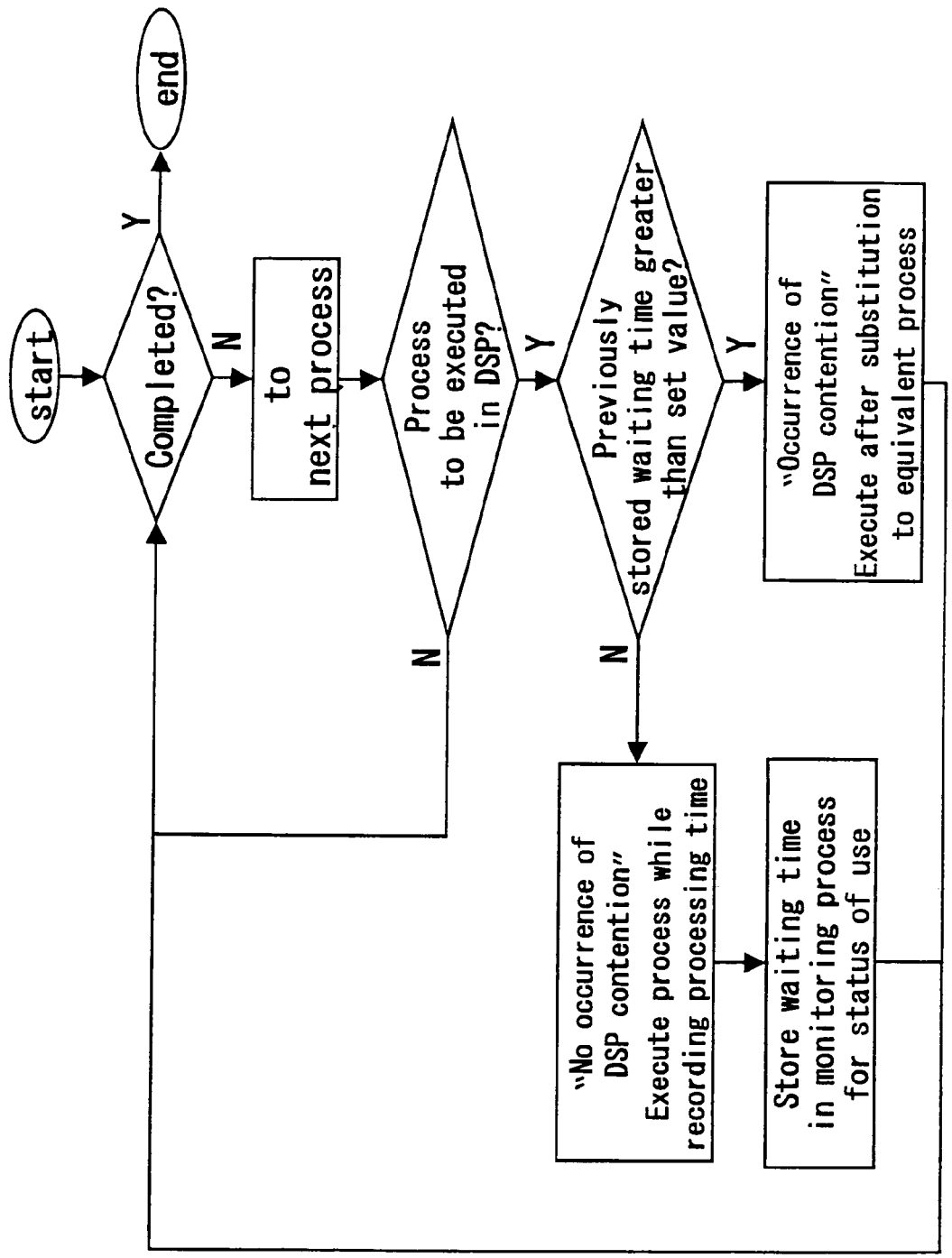
FIG. 28 shows a flow chart that represents a determining flow of DSP contention in the software processing system in accordance with the fourth embodiment of the present invention.

Here, "wait_time" in the present embodiment can be stored in the monitoring device for the status of use in the third embodiment so that the determination for DSP contention may be carried out. FIG. 28 shows a determination flow for DSP contention in this case. After finding the waiting time, the waiting time is also stored in the monitoring device for the status of use so that it becomes possible to dynamically determine DSP contention, and consequently to prevent a reduction in the processing speed due to DSP contention.

Fifth Embodiment

Figure 29:
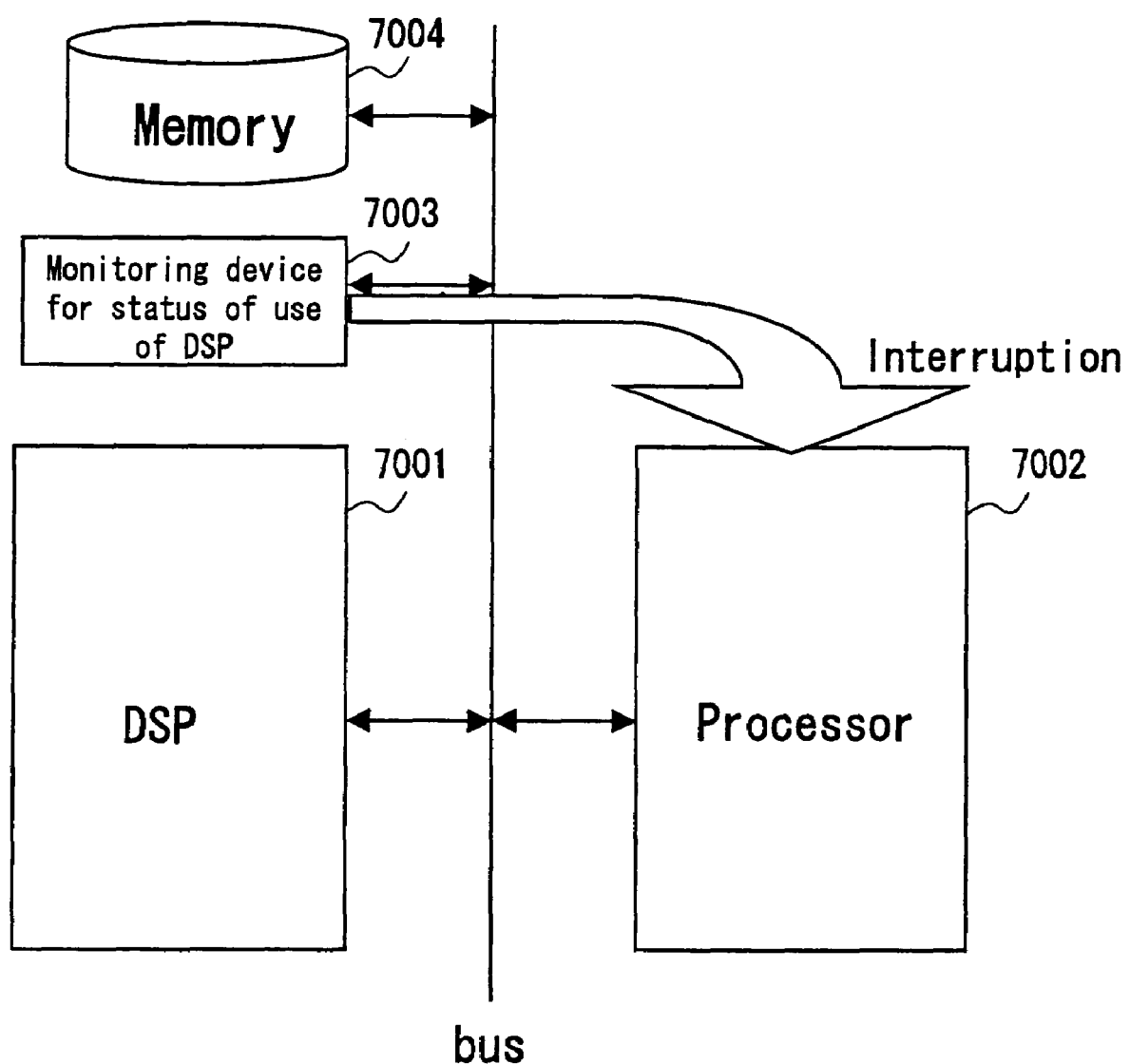
FIG. 29 is a block diagram that shows a hardware structure of a software processing system in accordance with a fifth embodiment of the present invention.

FIG. 29 is a block diagram that shows a hardware structure of a software processing system in accordance with the fifth embodiment. The software processing system is constituted by a DSP 7001, a processor 7002, a monitoring device 7003 for the status of use of the DSP and a memory 7004. The memory 7004 stores an object code shown in FIG. 30 as a process to be executed by the DSP 7001 and the processor 7002. The memory 7004, which serves as a shared memory when the DSP 7001 and the processor 7002 execute the process, stores the results of process and the processing data.

The processor 7002 controls the DSP 7001 through a rejecting control system. In the case when the processor 7002 fetches software from the memory 7004, and decodes it to be executed by the DSP 7001, the processor 7002 issues a processing request to the DSP 7001 so that the DSP 7001 executes the corresponding process. Here, the following description discusses the issuance of the processing request from the processor 7002 to the DSP 7001 more specifically.

The processor 7002 first writes processing commands and data required for carrying out the process in a command buffer placed in the DSP 7001. After the data writing operation, the processor 7002 issues a starting request for the process to the DSP 7001. Upon receipt of the request, the DSP 7001 executes the process by reading the processing commands and data from the command buffer. In other words, the processing request from the processor 7002 to the DSP 7001 refers to a sequence of processes including the writing operation of processing commands and data in the command buffer of the DSP 7001 and the issuance of the starting request for the process.

Moreover, the monitoring device 7003 for the status of use of the DSP 7001 monitors whether or not the DSP 7001 is currently executing any process, while monitoring whether or not the processor 7002 writes processing commands and data in the command buffer of the DSP 7001. In the case when the processor 7002 carries out a writing operation on the command buffer of the DSP 7001 so as to issue a processing request, while the DSP 7001 is executing any process, the monitoring device 7003 for the status of use of the DSP gives an interrupt signal to the processor 7002. Upon receipt of the interrupt signal, the processor 7002 proceeds to an interrupting routine to stop the issuance of the starting request for the process from the processor 7002 to the DSP 7001. As a result, although the processing commands and data have been stored in the command buffer in the DSP 7001, the starting request for the process to the DSP 7001 is stopped; therefore, the DSP 7001 is not allowed to newly carry out a process. In other words, the interrupt signal cancels the new processing request to the DSP 7001.

Upon receipt of the interrupt signal, the processor 7002 carries out a substituting process in place of the process to be executed by the DSP 7001. Here, the substituting process is a process that does not use the DSP 7001, and is functionally equivalent to the process to be executed by the DSP 7001 and executed on the processor 7002.

In order to achieve operations for the above-mentioned interrupt signal, with respect to each of the processes to be executed in the DSP 7001, a process that is functionally equivalent to the process, but is executed in the processor 7002 is prepared. Upon receipt of an interrupt signal from the monitoring device 7002 for the status of use for the DSP, the processor 7002 stops issuing the processing request to the DSP 7001, and the processor 7002 itself executes the equivalent process in place of the DSP.

FIG. 30 shows software in the software processing system in accordance with the present embodiment. Main functions include func1, func2, func3, func4, func5, func6, func7 and func8, and among these, processes to be executed in the DSP 7001 are func2, func4 and func6. The software contains a processor-use library corresponding to processes to be executed on the processor 7002 and DSP-use library corresponding to processes to be executed on the DSP 7001. With respect to func2, func4 and func6 in FIG. 30, these processes can be executed on the DSP 7001 by using the DSP-use library containing fun2_dsp, func4_dsp and func6_dsp, and can also be executed on the processor 7002 by using the CPU-use library containing func2_cpu, func4_cpu and func6_cpu.

Figure 31:
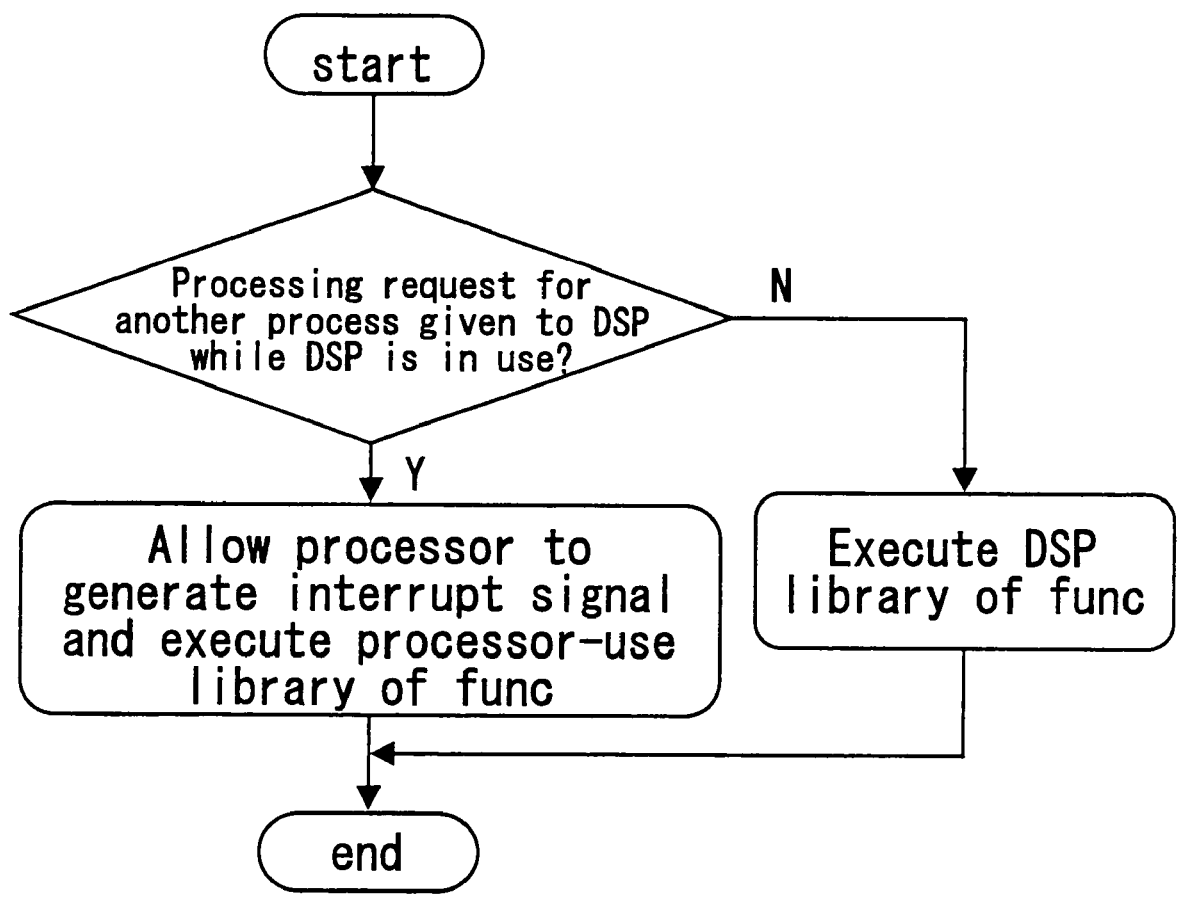
FIG. 31 shows a flow chart that indicates a processing flow at the time of DSP contention in accordance with the fifth embodiment of the present invention.

FIG. 31 shows a flow chart at the time when a DSP contention occurs upon executing the software in FIG. 30. As described earlier, in the case when a processing request is to be newly issued to the DSP 7001 when the DSP 7001 is executing another process, an interrupt signal is given to the processor 7002 so that the process that uses a DSP-use library is replaced by another process that uses an CPU-use library.

Next, referring to FIG. 32, the following description discusses a specific example of the sequence of processes.

FIG. 32A shows a case in which no task contention occurs in the DSP 7001. In this case, func1 is executed in the DSP 7002. After having executed func1, the processor 7002 issues a processing request for func2 to the DSP 7001, and the DSP7001 executes func2_dsp. Here, the processor 7002 executes func3. After having executed func2, the DSP 7001 writes the results of the process in the memory 7004. The memory 7004 is a shared memory that can be accessed by the processor 7002 and the DSP 7001. After func3 has been executed in the processor 7002, the DSP 7001 issues a processing request for func4, and the DSP 7001 executes func4, while the processor itself executes func5. After having executed func4, the DSP 7001 writes the results of the process in the memory 7004. After func5 has been executed in the processor 7002, the DSP 7001 issues a processing request for func6, and the DSP7001 executes func6_dsp, while the processor itself executes func7. After having executed func6, the DSP 7001 writes the results of the process in the memory 7004. The processor 7002 reads the results of the above-mentioned processes from the memory 7004, and executes func8.

In FIG. 32A, since no task contention occurs in the DSP 7001, the resources in the processor 7002 and the DSP 7001 can be utilized efficiently.

FIG. 32B shows a case in which a task contention occurs in the DSP 7001. In this case, before func2_dsp has not been finished, the processor 7002 issues a processing request for func4, with the result that a DSP contention occurs. As a result, the process of func4 is stopped until the completion of func2_dsp, causing a reduction in the processing speed of the system.

Therefore, in the present embodiment, the monitoring device 7003 for the status of use for the DSP determines whether or not any DSP contention is occurring, and generates an interrupt signal to the processor 7002 that is to issue a processing request for func4. Upon receipt of the signal, the processor 7002 suspends func5 that is being executed by the processor itself, and the processor 7002 executes func4 by using func4_cpu that is a CPU-use library, and writes the results of the process in the memory 7004. Thereafter, the processor 7002 resumes func5 that has been suspended.

As described above, in the software processing system of the present embodiment, a DSP contention is determined while a process is being executed, and by appropriately assigning the process to the DSP 7001 or the processor 7002, the DSP contention is avoided to prevent a reduction in the processing speed. Moreover, the monitoring device 7003 for the status of use of the DSP is used, that is, a hardware process is carried out, so that neither revision nor addition in description is given to the source code 4102 except that an interrupting routine is prepared; thus, this method is also applicable to a case in which software is given as assemblers and object codes.

Sixth Embodiment

Referring to Figures, the following description discusses a sixth embodiment of the present invention.

Figure 33:
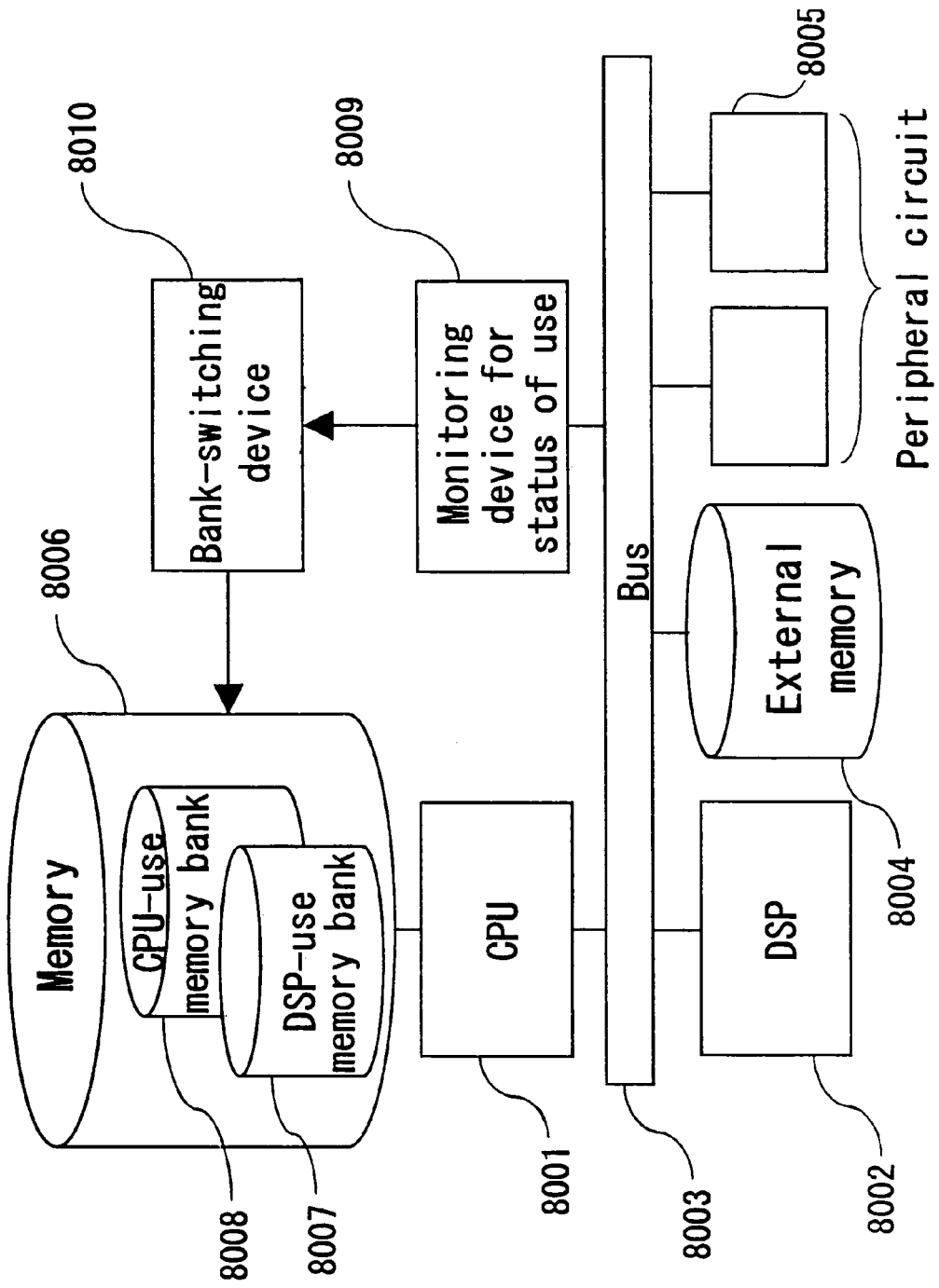
FIG. 33 is a block diagram that shows a hardware structure of a software processing system in accordance with a sixth embodiment of the present invention.

FIG. 33 is a block diagram that shows a hardware structure of a software processing system in accordance with embodiment 6 of the present invention. Reference numeral 8001 represents a CPU; 8002 is a DSP; 8003 is a bus; 8004 is an external memory; 8005 is a peripheral circuit; 8006 is a memory in the CPU 8001; 8007 is a memory bank for the DSP 8002 that is a bank format in the memory 8006; 8008 is a memory bank for the CPU 8001 that is a bank format in the memory 8006; 8009 is a monitoring device for the status of use that monitors whether or not the DSP 8002 is carrying out a process; and 8010 is a bank-switching device which switches the DSP-use memory bank 8007 and the CPU-use memory bank 8008.

Figure 34:
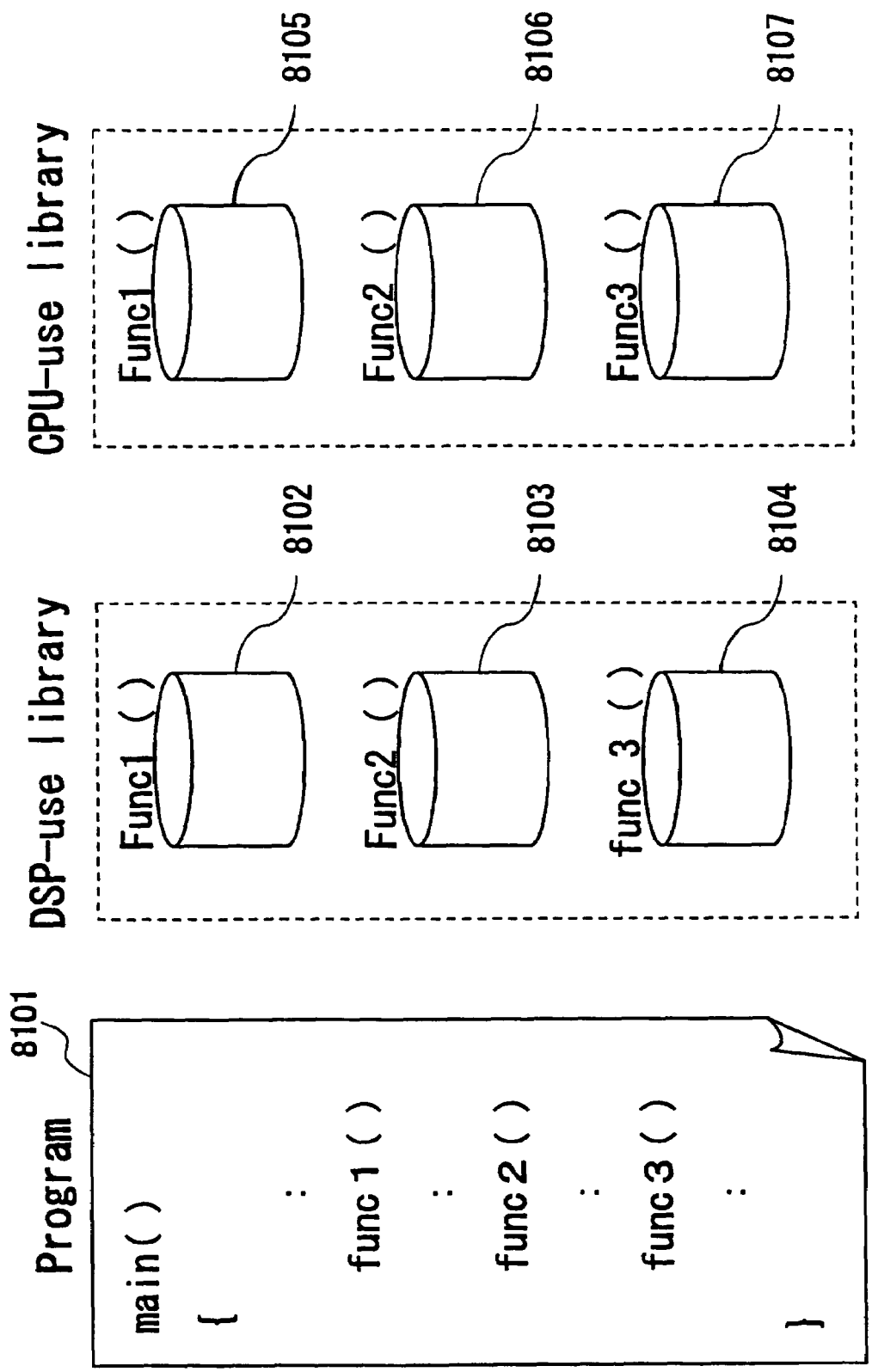
FIG. 34A shows a software structure of a software processing system in accordance with the sixth embodiment of the present invention.
FIG. 34B shows processes that are formed into a library containing commands that use the DSP, and are written in a program.
FIG. 34C shows equivalent processes that are formed into a library containing commands that use the CPU.

FIG. 34 shows a software structure of the software processing system. Reference numeral 8101 represents a program that is operated on the CPU 8001 and the DSP 8002; 8102, 8103 and 8104 are processes that are described in the program 8101, and formed into libraries containing commands that use the DSP 8002; and 8105, 8106 and 8107 are processes that have the same functions as the processes 8102, 8103 and 8104, and formed into libraries containing commands that use the CPU 8001.

Figure 35:
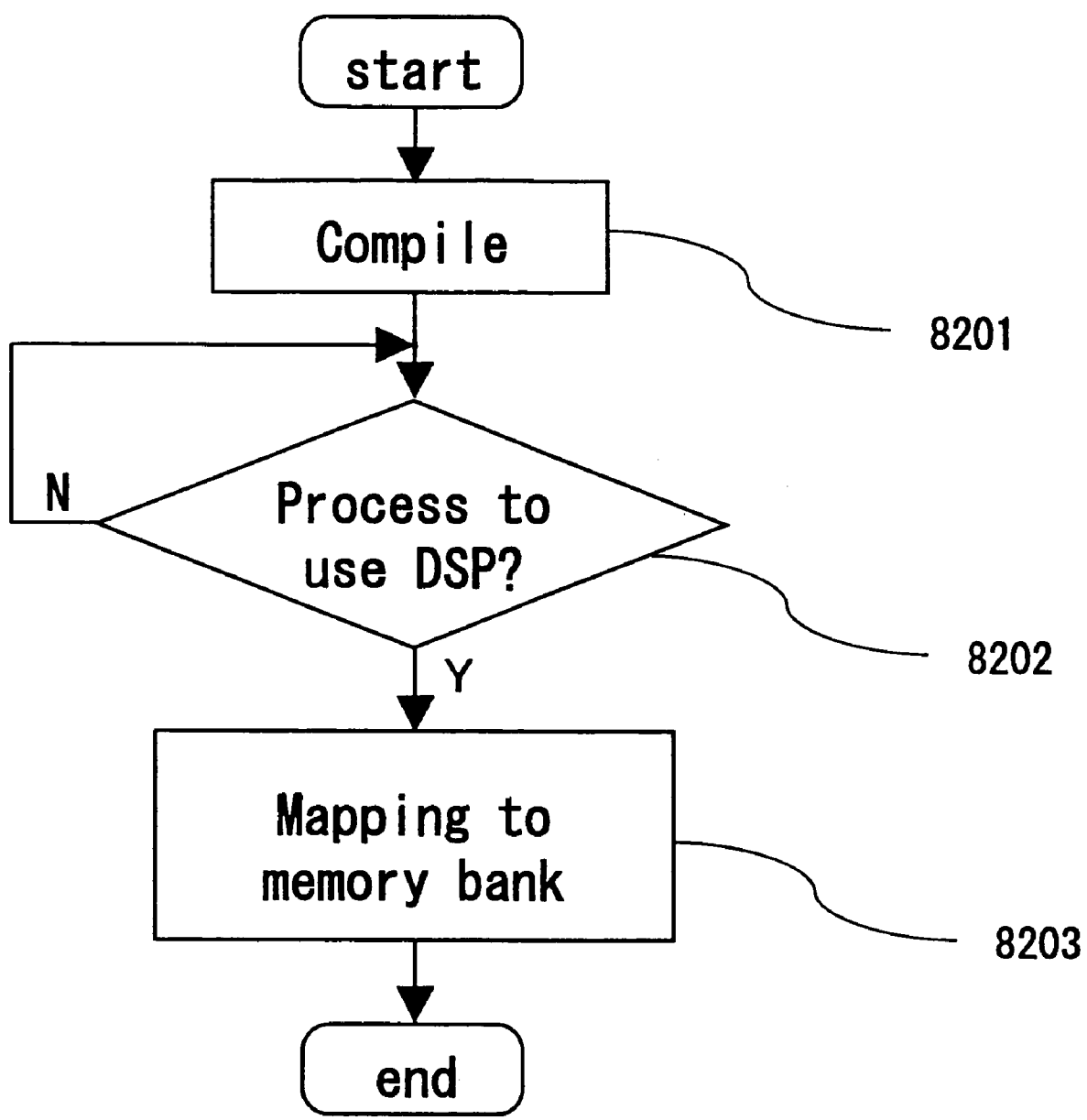
FIG. 35 shows a flow chart that represents a compile flow in the software processing system in accordance with the sixth embodiment of the present invention.

FIG. 35 is a flow chart that shows a compile flow in the software processing system. Reference numeral 8201 represents a compiling means for compiling the program 8101; 8202 is a process-identifying means for identifying processes to be executed in the DSP 8002; and 8203 is a mapping means that carries out a mapping process on the DSP-use memory bank 8007 or the CPU-use memory bank 8008.

The following description discusses operations of the present embodiment having the above-mentioned arrangement.

FIG. 36 shows a software mapping process with respect to the memory bank.

Upon receipt of a processing request from the CPU 8001, the DSP 8002 carries out thee process. The controlling system between the CPU 8001 and the DSP 8002 is a rejecting control system. Here, it is supposed that the processes func1, func2 and func3, described in the program 8101, contain commands that use the DSP 8002 or the CPU 8001, that, with respect to the sequence of processes, the processes are executed in the order of process func1, process func2 and process func3 and that the respective processes have no data dependence.

When the program 8101 is compiled by the compiling means 8201 that belongs to the compiler, the process-identifying means 8202 identifies processes func1, func2 and func3 that are processes containing commands that use the DSP 8002. Further, as shown in FIG. 36, the mapping means 8203 in the memory bank carries out mapping of the processes

8102, 8103 and 8104 that are formed into DSP 8002-use libraries on the DSP-use memory bank 8007. In the same manner, it also carries out mapping of the processes 8105, 8106 and 8107 that are formed into CPU 8001-use libraries on the CPU-use memory bank 8008. At this time, the process 8102 and the process 8105 have the same address as a starting address. The same is true for the process 8103 and the process 8106 as well as for the process 8104 and the process 8107. In this manner, the compiler is characterized in that it can identify processes that have the same name and are used for different processors, and compile the processes.

Suppose that upon executing the program 8101, process func1 is first carried out. Process func1 is called for, and instantaneously as the command of the starting address of the mapped process func1 is fetched by the CPU 8001, the bank-switching device 8010 carries out a locking process on the bank-switching operation. This locking process prevents another process from executing the bank-switching operation. Moreover, the monitoring device 8009 for the status of use has recognized information as to whether or not the DSP 8002 is carrying out any process, and this information forms an input signal to the bank-switching device 8010, and the bank-switching device 8010 gives a request for executing the bank-switching operation to the memory 8006.

First, in the case when the DSP 8002 is not executing any other process, the bank-switching operation places the DSP-use memory bank 8007 on the surface side, while placing the CPU-use memory bank 8008 on the rear side. This bank-switched state is maintained by the previous locking process of the bank-switching operation. While the locking process of the bank-switching operation is being executed, since the surface side of the bank switching is the DSP-use memory bank 8007, the CPU 8001 takes out the process 8102 from the DSP-use memory bank 8007. The process 8102 contains commands that use the DSP 8002, and the CPU 8001 issues a command that uses the DSP 8002 so that the DSP 8002 executes the corresponding processes. Since the DSP 8002 carries out a rejecting control, it is not possible to identify the time at which the process relating to this command is finished. Upon returning to the main function of the program 8101 that is the calling end of process func1, instantaneously as the command used for returning to the main function is fetched by the CPU 8001, the bank-switching device 8010 carries out an unlocking operation on the bank-switching process. Then, the bank-switching request to the memory 8006 is accepted, and consequently, the CPU-use memory bank 8008 is placed on the surface side with the DSP-use memory bank 8007 being placed on the rear side.

In the case opposite to this case, that is, in the case when, upon calling for process func1, the DSP 8002 is executing any other process, in the bank-switched state, the CPU-use memory bank 8008 is placed on the surface side with the DSP-use memory bank 8007 being placed on the rear side. Since the locking process of the bank-switching operation is being executed, this bank-switched state is maintained until the unlocking process is carried out. Since the DSP 8002 is being used by another process, the bank-switching device 8010 gives a request to the memory 8006 so that the bank-switching operation places the CPU-use memory bank 8008 on the surface side, while placing the DSP-use memory bank 8007 on the rear side.

Since the surface side of the bank switching is the CPU-use memory bank 8008, the CPU 8001 takes out a process 8105 from the CPU-use memory bank 8008. Since the process 8105, which has the same function as the process 8102 containing commands that use the DSP 8002, contains commands that use the CPU 8001, the CPU 8001 executes the corresponding process. In the case when, upon completion of the process 8105, the sequence returns to the main function of the program 8101 that is the calling end of process func1, instantaneously as the command used for returning to the main function is fetched by the CPU 8001, the bank-switching device 8010 carries out an unlocking operation on the bank-switching process. Then, the bank-switching request to the memory 8006 is accepted, and consequently, the CPU-use memory bank 8008 is placed on the surface side with DSP-use memory bank 8007 being placed on the rear side. In the case when, while the CPU 8001 is executing the process 8105, the other process using the DSP 8002 has been finished, upon receipt of the output of the monitoring device 8009 for the status of use, the bank-switching device 8010 issues a request for placing the DSP-use memory bank 8007 on the surface side of the bank switching, while placing the CPU-use memory bank 8008 on the rear side. Here, in the same manner as described earlier, this request is received and the bank switching is carried out, after the unlocking process for the bank switching has been carried out.

Next, suppose that, while a command in the process 8102 that uses the DSP 8002 in process func1 is being executed by the DSP 8002, the next process func2 is called for. In this case, since the DSP 8002 is being used, and since the previous unlocking process for the bank switching is being executed by the bank-switching device 8010, the CPU-use memory bank 8008 is placed on the surface side with the DSP-use memory bank 8007 being placed on the rear side in the bank-switched state. Process func2 is called for, and instantaneously as the command of the starting address of the mapped process func2 is fetched by the CPU 8001, the bank-switching device 8010 carries out a locking process on the bank-switching operation. This locking process prevents another process from executing the bank-switching operation.

Since the surface side of the bank switching is the CPU-use memory bank 8008, the CPU 8001 takes out a process 8106 from the CPU-use memory bank 8008. Since the process 8106, which has the same function as the process 8103 containing commands that use the DSP 8002, contains commands that use the CPU 8001, the CPU 8001 executes the corresponding process. In the case when, upon completion of the process 8106, the sequence returns to the main function of the program 8101 that is the calling end of process func2, instantaneously as the command used for returning to the main function is fetched by the CPU 8001, the bank-switching device 8010 carries out an unlocking operation on the bank-switching process. Then, the bank-switching request to the memory 8006 is accepted, and consequently, the CPU-use memory bank 8008 is placed on the surface side with DSP-use memory bank 8007 being placed on the rear side. In the case when, while the CPU 8001 is executing the process 8106, the command in the process 8102 using the DSP 8002 has been finished, in the same manner as the previous case in which upon executing the processing of process func1, the DSP 8002 is being used, the bank-switching device 8010 issues a request for bank switching to the memory 8006, and this request is accepted after the unlocking for the bank switching has been executed.

Lastly process func3 is called for. In the same manner as the previous process func1 in the case when the DSP 8002 is not in use, the bank-switching device 8010 requests for locking for the bank switching and for bank switching, a process 8104 containing commands that use the DSP 8002 is taken out from the DSP-use memory bank 8007 by the CPU 8001, and the commands that use the DSP 8002 are executed by the DSP 8002 as rejecting processes*. The unlocking process for the bank switching upon returning the sequence to the main function of the program 8101 and the bank switching operation for placing the CPU-use memory bank 8008 on the surface side of the bank switching while placing the DSP-use memory bank 8007 on the rear side thereof are executed in the same manner.

As described above, in the present embodiment, by using a method which uses the bank-switching device 8010, the occurrence of DSP contention in the DSP 8002 is alleviated so that the DSP 8002 can be effectively used. In order to achieve this method, the program 8101, as it is, can be applied without the necessity of any revision, and hardly any overhead operation of software is required. Moreover, by using exclusively-used hardware, that is, the monitoring device 8009 for the status of use and the bank-switching device 8010, the monitoring process for the status of use and the altering process for software processing of the bus 8003 can be achieved at comparatively high speeds.

Additionally, in the present embodiment, a processor is used as a single CPU and a resource is used as a DSP; however, a plurality of CPUs and a plurality of DSPs may be used respectively. In short, at least one resource and at least one processor that uses the resource are required.

From the above description, it will be apparent that the present invention provides.

What is claimed is:

1. A software processing method comprising:
   a monitoring step, which monitors a status of use of a resource identified as used by a process for a processor;
   a process identifying step, in which a compiler inserts a command that identifies a process using a resource into an input program;
   a determining step, in which the compiler inserts into the input program a command that determines a status of use of the identified resource based upon contention information obtained in the monitoring step; and
   a substituting step, in which the compiler inserts a command that substitutes an equivalent process for the process identified by the command inserted in the process identifying step, based upon results of the command inserted into the input program in the determining step; wherein
   the equivalent process is equivalent to the process identified by the command inserted in the process identifying step, and makes reduced use of the resource.

2. The software processing method according to claim 1, wherein: the resource is a storing device for a process, and the monitoring step for the status of use monitors the status of use of the storing device.

3. The software processing method according to claim 2, wherein: the monitoring step for status of use stores the preceding statuses of use of the storing device corresponding to a plurality of entries so that the contention information is generated based upon the stored status and current status of use.

4. The software processing method according to claim 2, wherein: the monitoring step for status of use stores the time of use when the storing device is in use, and based upon whether or not the time of use is not less than a predetermined value, the contention information is generated.

5. The software processing method according to claim 1, wherein: the resource comprises a storing device for a process and a bus that connects the processor to the storing device, and the monitoring step for status of use monitors the status of use of the bus.

6. The software processing method according to claim 5, wherein: the monitoring step for status of use stores the preceding statuses of use of the bus corresponding to a plurality of entries so that the contention information is generated based upon the stored status and current status of use.

7. The software processing method according to claim 5, wherein: the monitoring step for status of use stores the time of use when the bus is in use, and based upon whether or not the time of use is not less than a predetermined value, the contention information is generated.

8. The software processing method according to claim 1, wherein: the resource is a second processor that executes a process in response to a processing request from the processor, and the monitoring step for status of use monitors the status of use of the second processor.

9. The software processing method according to claim 1, wherein: the contention information is processing time from the issuance of the processing request for the resource until the completion of the process, and the determining process for the status of use is a process which compares the processing time to a preset value.

10. The software processing method according to claim 1, wherein: the contention information is waiting time from the issuance of the processing request for the resource until the start of the process, and the determining process for the status of use is a process which compares the waiting time to a preset value.

11. The software processing method according to claim 1, wherein the determining process for status of use reexamines the determination for the status of use of the resource regularly or irregularly.

12. The software processing method according to claim 11, wherein the determining process for status of use reexamines the determination for the status of use of the resource by using random numbers.

13. A software processing method comprising:
    a monitoring step for status of use, which monitors the status of use of a second processor, the second processor performing processing in response to a processing request by a first processor;
    an identifying step, in which a compiler identifies a process containing command to use the second processor;
    a mapping step, in which the compiler maps a first processor-use library formed process providing the processing request of the first processor to the second processor into a first memory bank and a second processor-use library formed process executed by the first processor into a second memory bank; and
    an altering step for software processes, which alters software processing processes executed by the first processor or the second processor in response to contention information, the contention information being obtained in the monitoring step for status of use, wherein
    the first processor can access a plurality of memory banks of a memory only for the first processor by using a same address, and the plurality of memory banks includes the first memory bank and the second memory bank; and
    the contention information is a signal indicating a switch from the first memory bank to the second memory bank.

14. The software processing method according to claim 13, further comprising the steps of:
    compiling a software:
    identifying a process which uses the second processor in the software; and
    mapping a process of using the first processor to the memory bank used for the first processor, and a process of using the second processor to a memory bank used for the second processor, wherein the signal that indicates memory bank switching indicates switching to the memory bank used for the first processor.

15. The software processing method according to claim 14, further comprising the step of:
locking an operation of memory bank switching so that a memory bank switching cannot take place in case the first processor or the second processor is performing processing.

16. The software processing method according to claim 15, farther comprising the step of:
unlocking the locked operation when the first processor or the second processor has finished the processing so that the signal that indicates memory bank switching can be accepted.

17. A software processing method comprising:
a monitoring step, which monitors a status of use of a resource identified as used by a process for a processor;
a process identifying step, in which a compiler inserts a command that identifies a process using a resource into an input program;
a storing step for storing contention information obtained in the monitoring step at a current time;
a determining step, in which the compiler inserts into the input program a command that determines a status of use of the identified resource based upon contention information stored at a past time; and
a substituting step, in which the compiler inserts a command that substitutes an equivalent process for the process identified by the command inserted in the process identifying step, based upon results of the command inserted into the input program in the determining step; wherein
the equivalent process is equivalent to the process identified by the command inserted in the process identifying step, and makes reduced use of the resource.

18. The software processing method according to claim 17, wherein: the contention information is processing time from the issuance of the processing request for the resource until the completion of the process, and the determining process for the status of use is a process which compares the processing time to a preset value.

19. The software processing method according to claim 17, wherein: the contention information is waiting time from the issuance of the processing request for the resource until the start of the process, and the determining process for the status of use is a process which compares the waiting time to a preset value.

20. The software processing method according to claim 17, wherein the determining process for status of use reexamines the determination for the status of use of the resource regularly or irregularly.

21. The software processing method according to claim 20, wherein the determining process for status of use reexamines the determination for the status of use of the resource by using random numbers.

22. The software processing method according to claim 17, further comprising:
a process identifying step for identifying whether or not a process uses the resource from the software; and
an appearance portion identifying step for identifying the portions of appearance of the processes identified by the process identifying step, in the case when processes to be extracted by the process identifying step are extracted from a plurality of portions of the software,
wherein the storing step stores the contention information for each of the portions of appearance so that the determining step carries out the determination by using the contention information stored for each of the portions of appearance.

23. A software processing system comprising:
a first processor;
a second processor for performing processing in response to a processing request by the first processor;
a use status monitoring device for monitoring a use status of the second processor;
a plurality of memory banks of a memory for the first processor that are accessible by only the first processor by using a same address, the plurality of memory banks including a first memory bank and a second memory bank;
a compiler for identifying a process containing command to use the second processor and mapping a first processor-use library formed process providing the processing request of the first processor to the second processor into the first memory bank and a second processor-use library formed process executed by the first processor into the second memory bank; and
a bank switching device for altering software processing processes performed by the first processor or the second processor in response to contention information, the contention information being obtained by the use status monitoring device, wherein
the contention information is a signal indicating a switch from the first memory bank to the second memory bank.

* * * * *